US012195304B2

(12) United States Patent
Kato et al.

(10) Patent No.: US 12,195,304 B2
(45) Date of Patent: Jan. 14, 2025

(54) BREAK DETECTION DEVICE CONFIGURED TO DETERMINE WHETHER OR NOT A BROKEN PORTION IS PRESENT IN A ROPE

(71) Applicant: Mitsubishi Electric Corporation, Tokyo (JP)

(72) Inventors: Toshiaki Kato, Tokyo (JP); Daisuke Nakazawa, Tokyo (JP); Daiki Fukui, Tokyo (JP); Akihiro Nakaya, Tokyo (JP); Hiroyuki Murakami, Tokyo (JP); Hideki Shiozaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1583 days.

(21) Appl. No.: 16/344,810

(22) PCT Filed: Jan. 13, 2017

(86) PCT No.: PCT/JP2017/001080
§ 371 (c)(1),
(2) Date: Apr. 25, 2019

(87) PCT Pub. No.: WO2018/131145
PCT Pub. Date: Jul. 19, 2018

(65) Prior Publication Data
US 2020/0055700 A1 Feb. 20, 2020

(51) Int. Cl.
*B66B 5/00* (2006.01)
*B66B 5/02* (2006.01)
(Continued)

(52) U.S. Cl.
CPC .............. *B66B 5/12* (2013.01); *B66B 7/1215* (2013.01)

(58) Field of Classification Search
CPC .................... B66B 5/00; B66B 5/0006; B66B 5/0018–0037; B66B 5/02; B66B 5/12; B66B 7/12–1238
See application file for complete search history.

(56) References Cited

U.S. PATENT DOCUMENTS 9,676,592 B2 * 6/2017 Wells ...................... B66B 5/022

FOREIGN PATENT DOCUMENTS

JP 10-81462 A 3/1998
JP 4896692 B2 3/2012
(Continued)

OTHER PUBLICATIONS

Office Action issued on Sep. 14, 2020, in the corresponding Korean patent application No. 10-2019-7019176, 9 pages.
(Continued)

*Primary Examiner* — Christopher Uhlir
(74) *Attorney, Agent, or Firm* — XSENSUS LLP

(57) ABSTRACT

A break detection device includes a sensor, an abnormal variation detection unit (22), a storage unit (20), an arithmetic unit (23), and a break determination unit (24). The arithmetic unit (23) increases a determination score when the abnormal variation detection unit (22) detects occurrence of an abnormal variation when a car (1) passes a position stored in the storage unit (20). The arithmetic unit (23) decreases the determination score when the abnormal variation detection unit (22) does not detect the occurrence of the abnormal variation when the car (1) passes the position. The break determination unit (24) determines whether or not a broken portion is present in a rope on the basis of the determination score.

44 Claims, 19 Drawing Sheets

(51) Int. Cl.
*B66B 5/12* (2006.01)
*B66B 7/12* (2006.01)

(56) References Cited

FOREIGN PATENT DOCUMENTS

| | | | |
|---|---|---|---|
| JP | 2014-108834 | A | 6/2014 |
| JP | 2016-222420 | A | 12/2016 |
| WO | 2017/022709 | A1 | 2/2017 |
| WO | 2017/203609 | A1 | 11/2017 |

OTHER PUBLICATIONS

Japanese Office Action dated Jul. 7, 2020 in Japanese Application No. 2018-561758.
Office Action issued Apr. 20, 2020 in Chinese Patent Application No. 201780081800.2, 8 pages.
Office Action issued on Mar. 25, 2021, in corresponding Indian patent Application No. 201947024796, 7 pages.
International Search Report and Written Opinion mailed on Apr. 18, 2017 for PCT/JP2017/001080 filed on Jan. 13, 2017, 13 pages with translation of the International Search Report.

* cited by examiner

No. 11: TRACTION MACHINE
No. 12: LOAD WEIGHING DEVICE
No. 13: CONTROLLER
No. 14: ACCELEROMETER
No. 15: GOVERNOR
No. 18: ENCODER
No. 20: STORAGE UNIT
No. 21: CAR POSITION DETECTION UNIT
No. 22: ABNORMAL VARIATION DETECTION UNIT
No. 23: ARITHMETIC UNIT
No. 24: BREAK DETERMINATION UNIT
No. 25: OPERATION CONTROL UNIT
No. 26: NOTIFICATION UNIT

S110:STOP AT NEAREST FLOOR AND NOTIFICATION

S210:STOP AT NEAREST FLOOR AND NOTIFICATION
S211:DOES ABNORMAL VARIATION OCCUR WHEN THERE IS NO PASSENGER?

S405:SET DETECTION VALUE TO POSITIVE VALUE

S410:STOP AT NEAREST FLOOR AND NOTIFICATION

POSITION OF CAR [m]
P
P1
0
t1
t2
t3
t4
TIME [s]

TORQUE OF TRACTION MACHINE [Nm]
Tq1
0
-Tq2
t1
t2
t3
t4
TIME [s]

BPF OUTPUT
Th1
t1
t2
t3
t4
TIME [s]

DETECTION VALUE
1
0
t1
t2
t3
t4
TIME [s]

Th6=0.7
MOVING AVERAGE OF DETECTION VALUE
1
0.75
0.5
0.25
0
t1
t2
t3
t4
TIME [s]

S605: SET DETECTION VALUE TO POSITIVE VALUE
S610: STOP AT NEAREST FLOOR AND NOTIFICATION
S611: ANNOUNCEMENT FOR ASKING PASSENGERS TO GET OUT OF CAR

BREAK DETECTION DEVICE CONFIGURED TO DETERMINE WHETHER OR NOT A BROKEN PORTION IS PRESENT IN A ROPE

CROSS-REFERENCE TO RELATED APPLICATION

The present application is based on PCT filing PCT/JP2017/001080 filed Jan. 13, 2017, the entire contents of which are incorporated herein by reference.

FIELD

The present invention relates to a device for detecting a break of a wire or a break of a strand that occurs in a rope.

BACKGROUND

Various ropes are used in an elevator device. For example, a car of an elevator is suspended in a shaft by a main rope. The main rope is wound around a sheave such as a driving sheave of a traction machine. The main rope is repeatedly bent by movement of the car. Consequently, the main rope is gradually degraded. When the main rope is degraded, wires constituting the main rope are broken. When a large number of wires are broken, a strand formed by twisting wires together may be broken. A break of the wire or a break of the strand occurs also due to a foreign object engaged between the main rope and the sheave.

A broken wire or strand protrudes from a surface of the main rope. Consequently, when an operation of the elevator is performed in a state in which a wire or a strand is broken, the broken wire or strand comes into contact with equipment provided in the shaft.

PTL 1 describes an elevator device. In the elevator device described in PTL 1, a detection member is provided so as to face a main rope. In addition, a displacement of the detection member is detected by a sensor. A break of a wire or a strand is detected on the basis of the displacement detected by the sensor.

CITATION LIST

Patent Literature

[PTL 1] Japanese Patent No. 4896692 B

SUMMARY

Technical Problem

In an elevator device, for each sheave, a range of a main rope that passes through the sheave is predetermined. For example, a portion in a certain range of the main rope passes through a driving sheave. The portion passing through the driving sheave does not necessarily pass through a suspension sheave of a counterweight. Accordingly, when a break of a wire or a break of a strand is to be detected by using the sensor described in PTL 1, it is necessary to install the sensor at the position of each sheave around which the main rope is wound. For example, in the case where the sensor is installed at a position of the suspension sheave of the counterweight, a signal line needs to be laid between the counterweight and a controller. A problem arises in that a large number of the sensors are necessary and a signal line has to be extended from each sensor, and hence a configuration is complicated. In particular, in the elevator device having a 2:1 roping system in which many sheaves are used, the above problem becomes conspicuous.

The invention is made in order to solve the above problem. An object of the present invention is to provide a break detection device capable of detecting occurrence of a break of a wire or a strand with a simple configuration with high accuracy.

Solution to Problem

A break detecting device of the present invention comprises a sensor having an output signal, the output signal varying when vibration is generated in a rope of an elevator, detection means for detecting occurrence of an abnormal variation in the output signal from the sensor, storage means for storing, when the detection means detects the occurrence of the abnormal variation, a position of a car of the elevator at the time of the occurrence of the variation in association with a determination score, arithmetic means for increasing the determination score when the detection means detects the occurrence of the abnormal variation when the car passes the position stored in the storage means, and decreasing the determination score when the detection means does not detect the occurrence of the abnormal variation when the car passes the position, and determination means for determining whether or not a broken portion is present in the rope on the basis of the determination score.

A break detecting device of the present invention comprises a sensor having an output signal, the output signal varying when vibration is generated in a rope of an elevator, detection means for detecting occurrence of an abnormal variation in the output signal from the sensor, storage means for storing, when the detection means detects the occurrence of the abnormal variation, a position of a car of the elevator at the time of the occurrence of the variation, and determination means for determining whether or not a broken portion is present in the rope on the basis of a frequency of the detection of the occurrence of the abnormal variation performed by the detection means when the car passes the position stored in the storage means.

Advantageous Effects of Invention

In the break detection device according to the present invention, for example, the arithmetic means increases the determination score when the detection means detects the occurrence of the abnormal variation when the car passes the position stored in the storage means. The arithmetic means decreases the determination score when the detection means docs not detect the occurrence of the abnormal variation when the car passes the position. The determination means determines whether or not the broken portion is present in the rope on the basis of the determination score. The break detection device according to the present invention is capable of detecting the occurrence of the break of the wire or the strand with the simple configuration with high accuracy.

DESCRIPTION OF EMBODIMENTS

Figure 1:
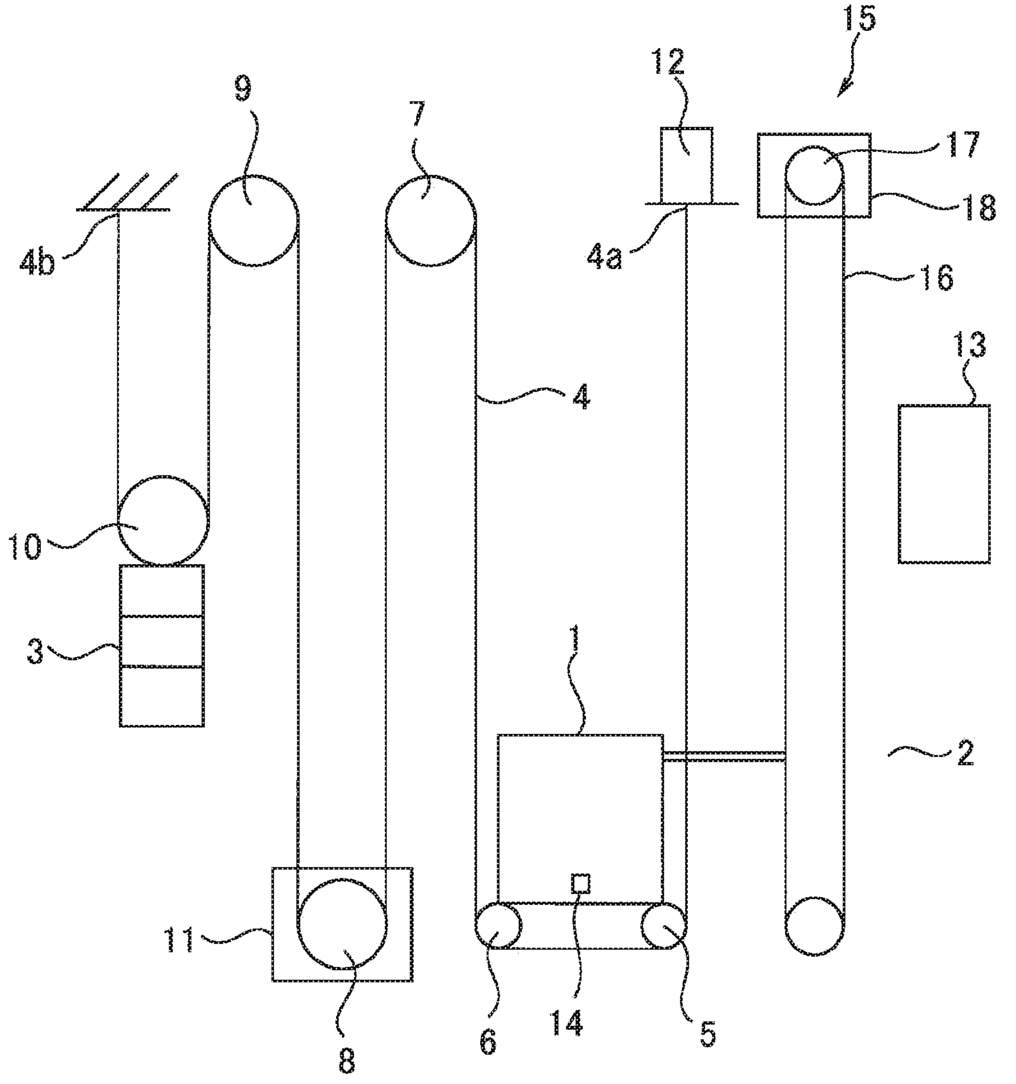
FIG. 1 is a view schematically showing an elevator device.

The present invention will be described with reference to the accompanying drawings. Redundant descriptions will be appropriately simplified or omitted. In the individual drawings, the same reference numerals denote the same or corresponding parts.

Embodiment 1

FIG. 1 is a view schematically showing an elevator device. A car 1 moves vertically in a shaft 2. The shaft 2 is a space that is formed in, for example, a building and vertically extends. A counterweight 3 moves vertically in the shaft 2. The car 1 and the counterweight 3 are suspended in the shaft 2 by a main rope 4. A roping system for suspending the car 1 and the counterweight 3 is not limited to an example shown in FIG. 1. For example, the car 1 and the counterweight 3 may be suspended in the shaft 2 by using 1:1 roping. Hereinbelow, an example in which the car 1 and the counterweight 3 are suspended by using 2:1 roping will be described in detail.

One end portion 4*a* of the main rope 4 is supported by a fixing member in the shaft 2. For example, the end portion 4*a* of the main rope 4 is supported by a fixing member provided at a top portion of the shaft 2. The main rope 4 extends downward from the end portion 4*a*. The main rope 4 is wound around a suspension sheave 5, a suspension sheave 6, a return sheave 7, a driving sheave 8, a return sheave 9, and a suspension sheave 10 from a side of the end portion 4*a*. The main rope 4 extends upward from a portion of the main rope 4 wound around the suspension sheave 10. The other end portion 4*b* of the main rope 4 is supported by a fixing member in the shaft 2. For example, the end portion 4*b* of the main rope 4 is supported by a fixing member provided at the top portion of the shaft 2.

The suspension sheave 5 and the suspension sheave 6 are included in the car 1. The suspension sheave 5 and the suspension sheave 6 are provided on, for example, a lower portion of a car floor. The suspension sheave 5 and the suspension sheave 6 are rotatable relative to the car floor. The return sheave 7 and the return sheave 9 are provided on, for example, fixing members at the top portion of the shaft 2. The return sheave 7 and the return sheave 9 are rotatable relative to the fixing members at the top portion of the shaft 2. The driving sheave 8 is included in a traction machine 11. The traction machine 11 is provided in, for example, a pit of the shaft 2. The suspension sheave 10 is included in the counterweight 3. The suspension sheave 10 is provided on, for example, an upper portion of a frame that supports weights. The suspension sheave 10 is rotatable relative to the frame.

The arrangement of the sheaves around which the main rope 4 is wound is not limited to the example shown in FIG. 1. For example, the driving sheave 8 may be placed at the top portion of the shaft 2. The driving sheave 8 may also be placed in a machine room (not shown) above the shaft 2.

A load weighing device 12 detects a load of the car 1. FIG. 1 shows an example in which the load weighing device 12 detects a load of the car 1 on the basis of a load applied to the end portion 4*a* of the main rope 4. The load weighing device 12 may be provided in the car 1. The load weighing device 12 outputs a load signal corresponding to the detected load. The load signal outputted from the load weighing device 12 is inputted to a controller 13.

An accelerometer 14 detects acceleration of the car 1. The car 1 is guided by guide rails (not shown) and moves in a vertical direction. Consequently, the accelerometer 14 detects acceleration of the car 1 in the vertical direction. The accelerometer 14 is provided in, for example, the car 1. The accelerometer 14 outputs an acceleration signal corresponding to the detected acceleration. The acceleration signal outputted from the accelerometer 14 is inputted to the controller 13.

The traction machine 11 has a function of detecting torque. The traction machine 11 outputs a torque signal corresponding to the detected torque. The torque signal outputted from the traction machine 11 is inputted to the controller 13.

A governor 15 operates a safety gear (not shown) when a descending speed of the car 1 exceeds a reference speed. The safety gear is included in the car 1. When the safety gear operates, the car 1 is forcibly stopped. The governor 15 includes, for example, a governor rope 16, a governor sheave 17, and an encoder 18. The governor rope 16 is wound around the governor sheave 17. When the car 1 moves, the governor rope 16 moves. When the governor rope 16 moves, the governor sheave 17 rotates. The encoder 18 outputs a rotation signal corresponding to a rotation direction and a rotation angle of the governor sheave 17. The rotation signal outputted from the encoder 18 is inputted to the controller 13. The encoder 18 is an example of a sensor that outputs a signal corresponding to a position of the car 1.

Figure 2:
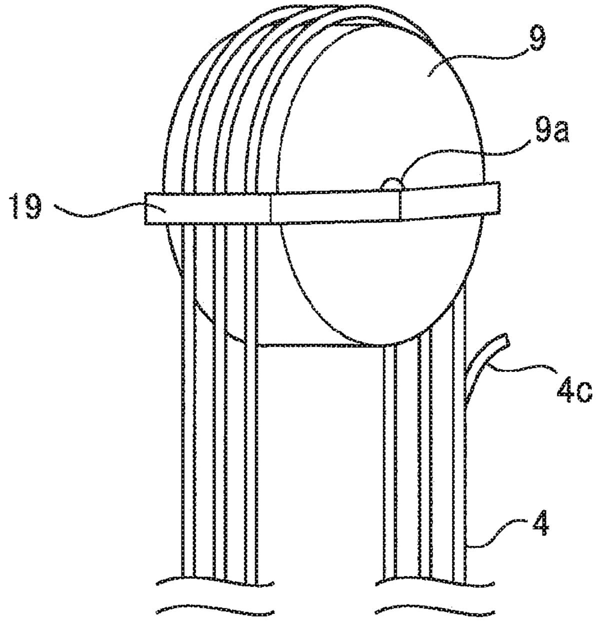
FIG. 2 is a perspective view showing a return sheave.
Figure 3:
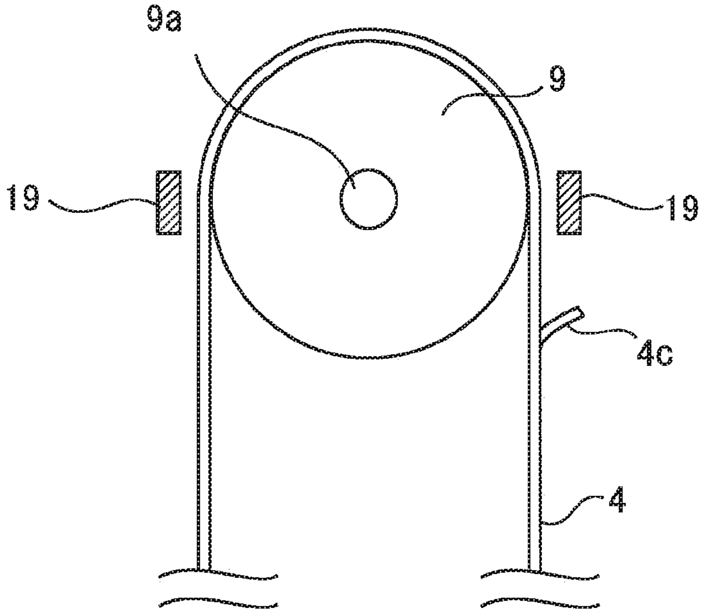
FIG. 3 is a view showing a cross section of the return sheave.

FIG. 2 is a perspective view showing the return sheave 9. FIG. 3 is a view showing a cross section of the return sheave 9. A rope guide 19 is provided on a member supporting the return sheave 9. Each of FIG. 2 and FIG. 3 shows an example in which the rope guide 19 is provided on a shaft 9*a* of the return sheave 9. The rope guide 19 prevents the main rope 4 from being detached from a groove of the return sheave 9. For example, the rope guide 19 faces, with a gap, a portion wound around the groove of the return sheave 9 in the main rope 4. When an abnormality is not present in the main rope 4, the main rope 4 does not come into contact with the rope guide 19.

Each of FIG. 2 and FIG. 3 shows an example in which a broken portion 4*c* protrudes from a surface of the main rope 4. The broken portion 4*c* is a portion in which a wire constituting the main rope 4 is broken. The broken portion 4*c* may also be a portion in which a strand formed by twisting wires together is broken. When the car 1 moves, the broken portion 4*c* can come into contact with the rope guide 19 when the broken portion 4*c* passes through the return sheave 9.

Each of FIG. 2 and FIG. 3 shows the return sheave 9 as an example of a sheave around which the main rope 4 is wound. A rope guide having the same function as that of the rope guide 19 may be provided on each of the suspension sheave 5, the suspension sheave 6, the return sheave 7, the driving sheave 8, and the suspension sheave 10. A rope guide having the same function as that of the rope guide 19 may be provided on another sheave that is not shown in FIG. 1.

Figure 4A:
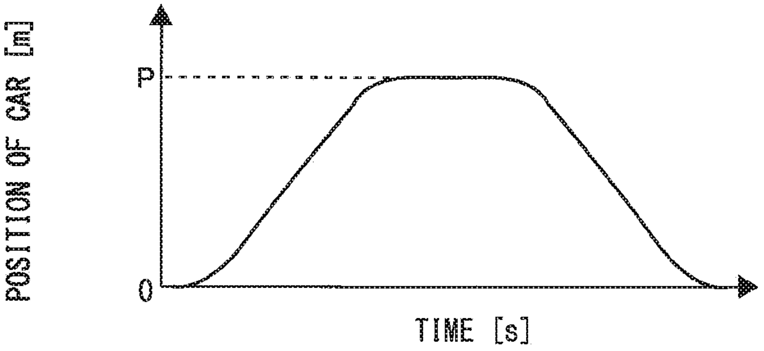
FIG. 4A is a view showing an examples of an output signals from a sensor.
Figure 4B:
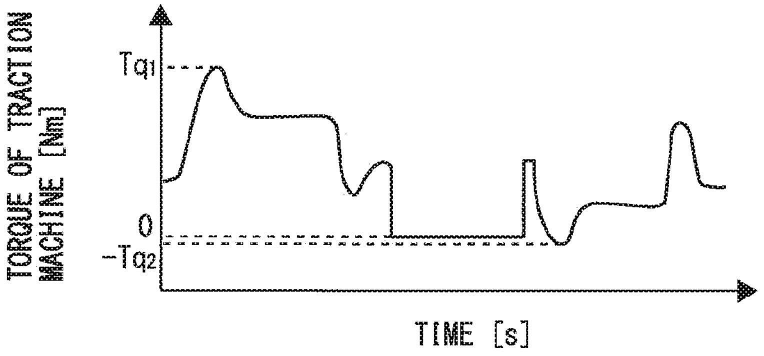
FIG. 4B is a view showing an example of an output signal from a sensor.
Figure 4C:
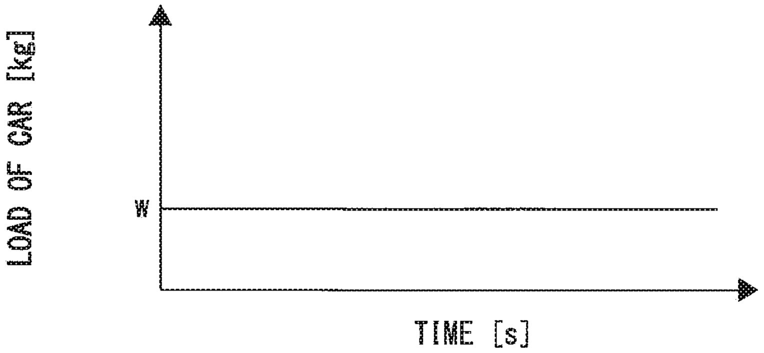
FIG. 4C is a view showing an example of an output signal from a sensor.
Figure 5A:
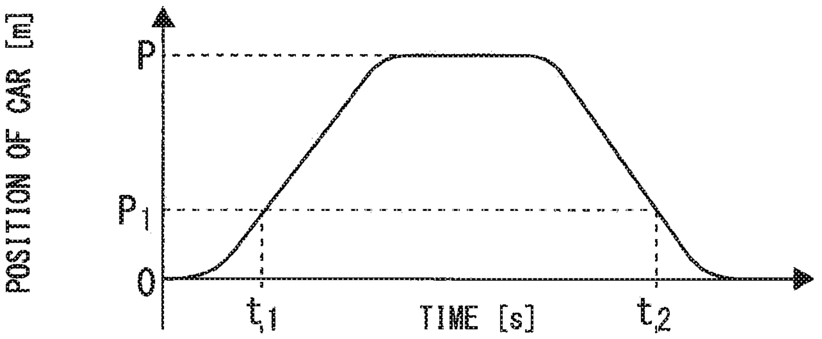
FIG. 5A is a view showing an examples of the output signals from the sensor.
Figure 5B:
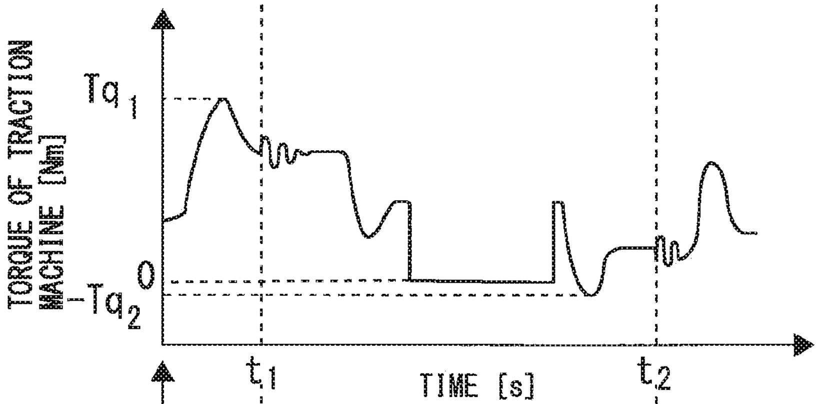
FIG. 5B is a view showing an example of the output signal from the sensor.
Figure 5C:
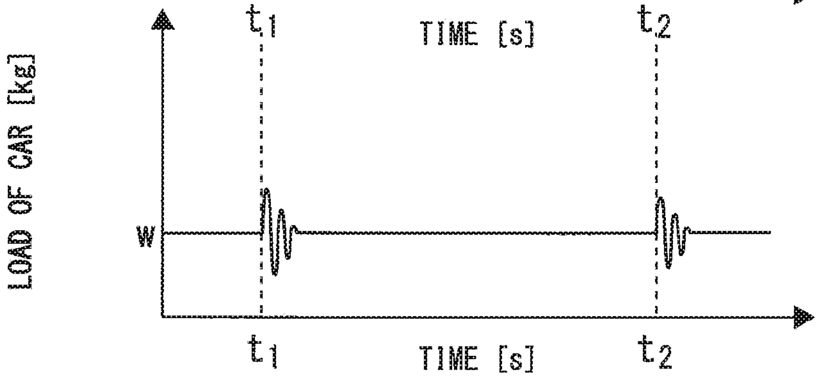
FIG. 5C is a view showing an example of the output signal from the sensor.

Each of FIG. 4 and FIG. 5 is a view showing examples of output signals from sensors. In the following description, an output signal from a sensor is also simply written as a sensor signal. Each of FIG. 4(*a*) and FIG. 5(*a*) shows a position of the car 1. In an example shown in the present embodiment, a position of the car 1 is synonymous with a height at which the car 1 is present. Each of FIG. 4(*a*) and FIG. 5(*a*) shows a change in car position when the car 1 has returned to a bottom floor after moving to a position P from the bottom floor. In the drawings, the position of the bottom floor is 0. Waveforms shown in FIG. 4(*a*) and FIG. 5(*a*) are acquired on the basis of, for example, the rotation signal from the encoder 18.

Each of FIG. 4(*b*) and FIG. 5(*b*) shows torque of the traction machine 11. Each of waveforms shown in FIG. 4(*b*) and FIG. 5(*b*) is a waveform of, for example, the torque signal outputted from the traction machine 11. Each of FIG. 4(*b*) and FIG. 5(*b*) shows the waveform of the torque signal outputted from the traction machine 11 when the car 1 has moved between the bottom floor and the position P. The maximum torque at this point is $T_{q1}$. The minimum torque is $-T_{q2}$.

Each of FIG. 4(*c*) and FIG. 5(*c*) shows a load of the car 1. Each of waveforms shown in FIG. 4(*c*) and FIG. 5(*c*) is a waveform of, for example, the load signal outputted from the load weighing device 12. Each of FIG. 4(*c*) and FIG. 5(*c*) shows an example in which the load of the car 1 is w [kg].

FIG. 4 shows examples of the waveforms obtained in the case where the broken portion 4*c* is not present in the main rope 4. On the other hand, FIG. 5 shows examples of the waveforms obtained in the case where the broken portion 4*c* is present in the main rope 4. The broken portion 4*c* passes through a given sheave when the car 1 passes a position $P_1$. The broken portion 4*c* comes into contact with a rope guide when the broken portion 4*c* passes through the sheave. With this, vibration is generated in the main rope 4 when the broken portion 4*c* passes through the sheave. When the end portion 4*a* of the main rope 4 is displaced, the load signal outputted from the load weighing device 12 is influenced. Consequently, when the vibration generated in the main rope 4 reaches the end portion 4*a*, the load signal from the load weighing device 12 varies.

Similarly, when a portion wound around the driving sheave 8 in the main rope 4 is displaced, the torque signal outputted from the traction machine 11 is influenced. Consequently, when the vibration generated in the main rope 4 reaches the above portion of the main rope 4, the torque signal from the traction machine 11 varies. When a portion wound around the suspension sheave 5 or the suspension sheave 6 in the main rope 4 is displaced, the acceleration signal outputted from the accelerometer 14 is influenced. Consequently, when the vibration generated in the main rope 4 reaches the above portion of the main rope 4, the acceleration signal from the accelerometer 14 varies.

Figure 6:
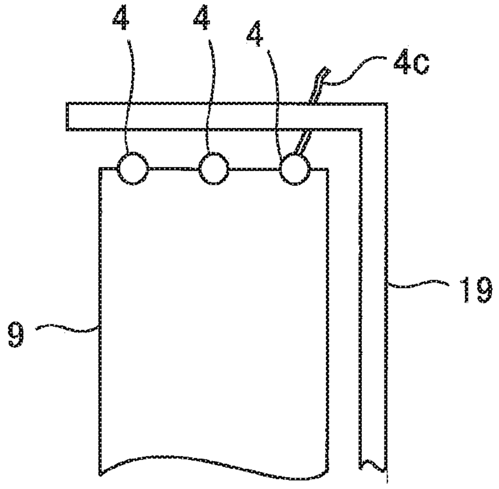
FIG. 6 shows an example of a broken portion.
Figure 7:
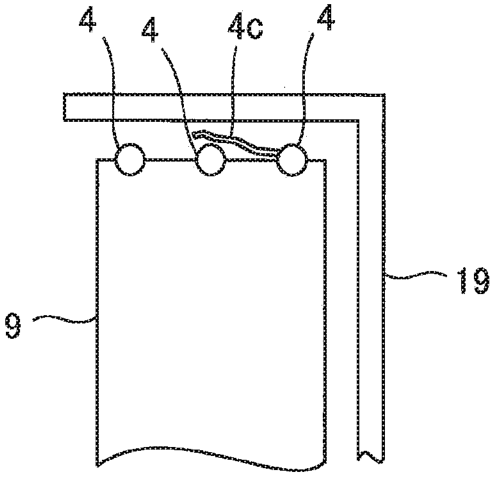
FIG. 7 shows an example of the broken portion.

Each of FIG. 6 and FIG. 7 shows an example of the broken portion 4*c*. FIG. 6 shows an example in which the broken portion 4*c* moves away from the return sheave 9 with approach to a tip. In the case where, as shown in FIG. 6, the broken portion 4*c* protrudes from the surface of the main rope 4, the broken portion 4*c* comes into contact with the rope guide 19 when the broken portion 4*c* passes through the return sheave 9. FIG. 5 shows the examples of the sensor signals in the case where the vibration is generated in the main rope 4 every time the broken portion 4*c* passes through the sheave.

FIG. 7 shows an example in which the broken portion 4*c* is extended along a surface of the return sheave 9. In the case where, as shown in FIG. 7, the broken portion 4*c* protrudes from the surface of the main rope 4, the broken portion 4*c* does not come into contact with the rope guide 19 when the broken portion 4*c* passes through the return sheave 9. Consequently, even when the broken portion 4*c* passes through the return sheave 9, the vibration is not generated in the main rope 4.

There are cases where the broken portion 4*c* comes into contact with the rope guide 19, and an orientation of the broken portion 4*c* is thereby changed. When the orientation of the broken portion 4*c* is changed from the orientation shown in FIG. 6 to the orientation shown in FIG. 7, the vibration is not generated in the main rope 4 even when the broken portion 4*c* passes through the return sheave 9. On the other hand, there are cases where the broken portion 4*c* is pushed by a surface of the groove when the broken portion 4$c$ passes through the return sheave 9, and the orientation of the broken portion 4$c$ is thereby changed. In addition, there are cases where the wire or the strand is further untied, and the orientation of the broken portion 4$c$ is thereby changed. When the orientation of the broken portion 4$c$ is changed from the orientation shown in FIG. 7 to the orientation shown in FIG. 6, the vibration is generated in the main rope 4 when the broken portion 4$c$ passes through the return sheave 9.

Figures 8A, 8B, 8C:
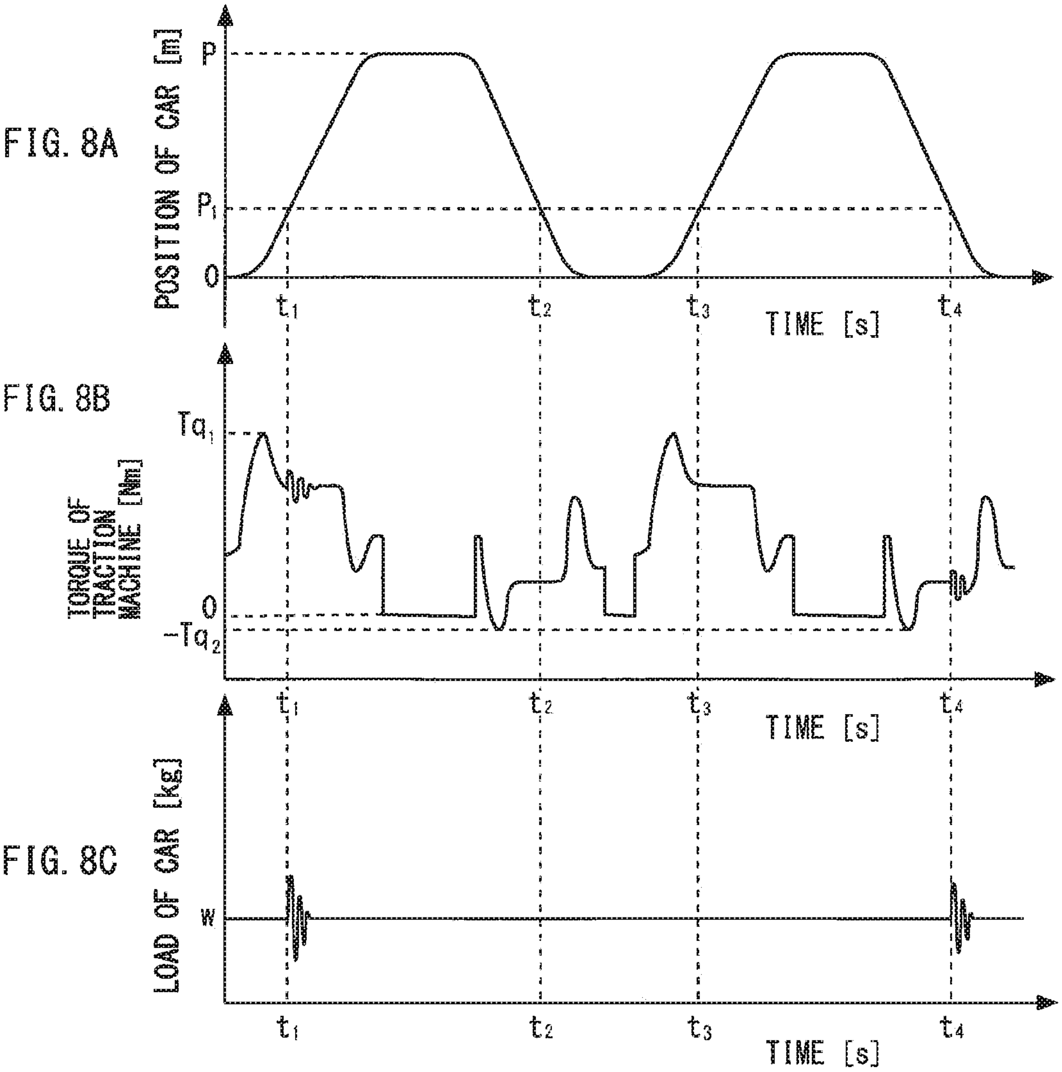
FIG. 8A is a view showing another example of the output signal from the sensor.
FIG. 8B is a view showing another example of the output signal from the sensor.
FIG. 8C is a view showing another example of the output signal from the sensor.

FIG. 8 is a view showing other examples of the output signals from the sensors. In the examples shown in FIG. 8, the car 1 makes two round trips between the bottom floor and the position P. The broken portion 4$c$ passes through a given sheave when the car 1 passes the position $P_1$. For example, the broken portion 4$c$ passes through the return sheave 9 at time $t_1$, time $t_2$, time $t_3$, and time $t_4$. The broken portion 4$c$ comes into contact with the rope guide 19 at time $t_1$. With this, the torque signal from the traction machine 11 varies at time $t_1$. Similarly, the load signal from the load weighing device 12 varies at time $t_1$.

For example, the broken portion 4$c$ comes into contact with the rope guide 19 at time $t_1$, and the orientation of the broken portion 4$c$ is thereby changed to the orientation shown in FIG. 7. In such a case, the broken portion 4$c$ does not come into contact with the rope guide 19 at time $t_2$ and time $t_3$. FIG. 8 shows an example in which the broken portion 4$c$ passes through the return sheave 9 at time $t_2$ and time $t_3$, and the orientation of the broken portion 4$c$ is thereby changed from the orientation shown in FIG. 7 to the orientation shown in FIG. 6. With this, the broken portion 4$c$ comes into contact with the rope guide 19 at time $t_4$. The broken portion 4$c$ comes into contact with the rope guide 19, and the torque signal from the traction machine 11 thereby varies at time $t_4$. Similarly, the load signal from the load weighing device 12 varies at time $t_4$. Thus, even when the broken portion 4$c$ protrudes from the surface of the main rope 4, the broken portion 4$c$ does not always come into contact with the rope guide 19.

Figure 9:
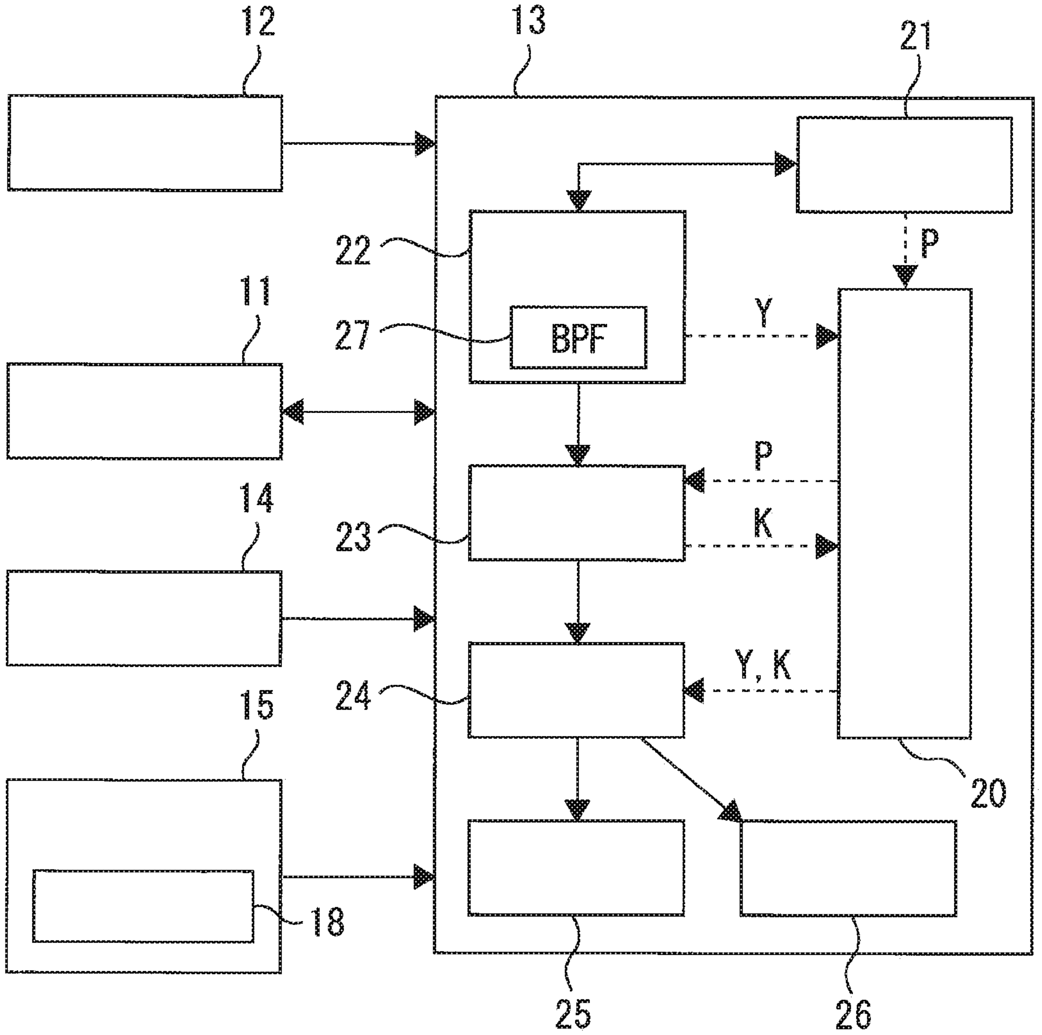
FIG. 9 is a view showing an example of a break detection device according to Embodiment 1 of the present invention.
Figure 10:
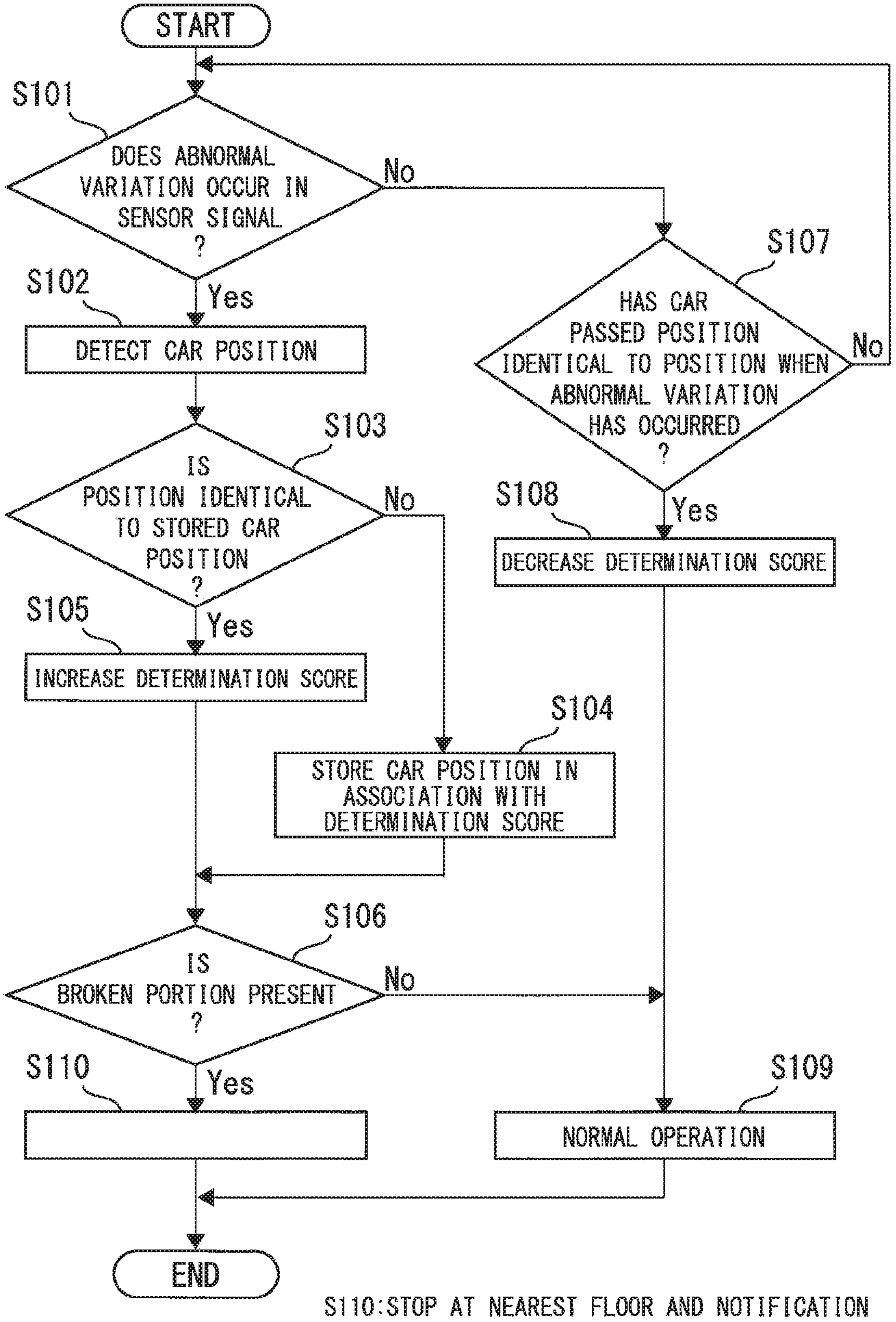
FIG. 10 is a flowchart showing an operation example of the break detection device according to Embodiment 1 of the present invention.
Figure 11A:
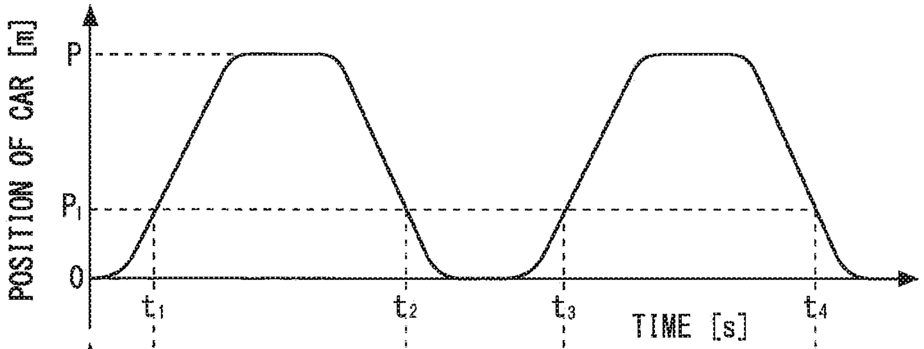
FIG. 11A shows a position of a car.
Figure 11B:
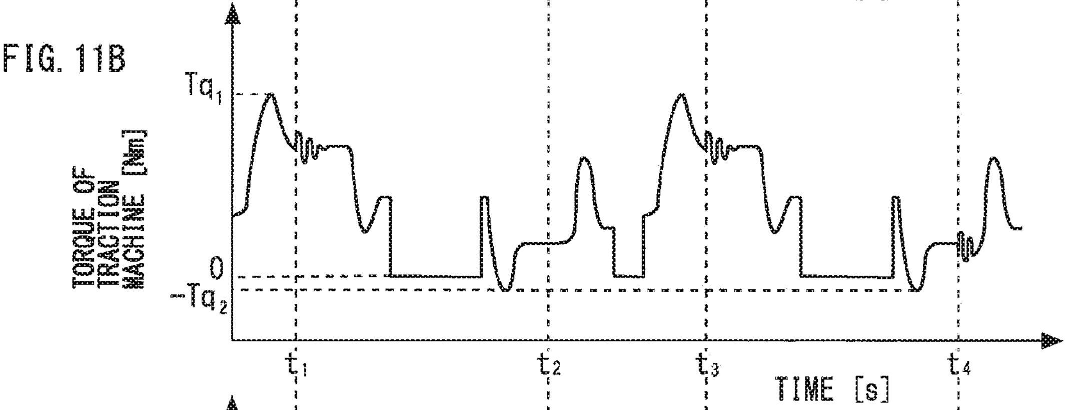
FIG. 11B shows torque of a traction machine.
Figure 11C:
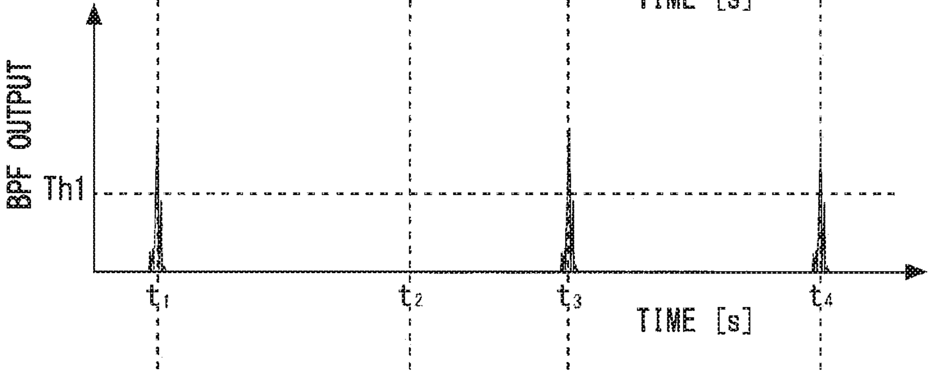
FIG. 11C shows an absolute value of a band-pass filter output.
Figure 11D:
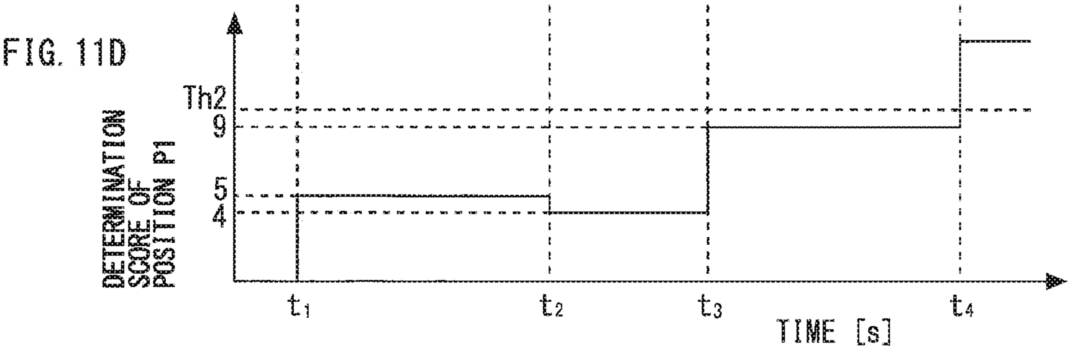
FIG. 11D shows an example of a change of a determination score.

FIG. 9 is a view showing an example of a break detection device according to Embodiment 1 of the present invention. The controller 13 includes, for example, a storage unit 20, a car position detection unit 21, an abnormal variation detection unit 22, an arithmetic unit 23, a break determination unit 24, an operation control unit 25, and a notification unit 26. Hereinbelow, functions and operations of the break detection device will be described in detail with reference to FIG. 10 and FIG. 11. FIG. 10 is a flowchart showing an operation example of the break detection device according to Embodiment 1 of the present invention.

The abnormal variation detection unit 22 determines whether or not an abnormal variation has occurred in a sensor signal (S101). In the example shown in the present embodiment, it is possible to use each of, for example, the load signal, the acceleration signal, and the torque signal as the sensor signal. Hereinbelow, an example in which the torque signal is used as the sensor signal will be described in detail. For example, the abnormal variation detection unit 22 determines whether or not an abnormal variation has occurred in the torque signal in S101. The abnormal variation detection unit 22 performs the above determination on the basis of preset conditions.

For example, when the broken portion 4$c$ comes into contact with the rope guide 19, an abnormal variation appears in the torque signal from the traction machine 11. The abnormal variation has a component in a unique frequency band corresponding to a length of the broken portion 4$c$ and a moving speed of the main rope 4. The abnormal variation detection unit 22 includes, for example, a band-pass filter 27. For simplifying the description, the band-pass filter is also written as a BPF in the drawings and the like. First, the abnormal variation detection unit 22 performs a filtering process to the inputted torque signal. For example, the band-pass filter 27 extracts a signal component in a characteristic frequency band. The signal component in the characteristic frequency band is a signal component generated by contact of the broken portion 4$c$ with the rope guide for the main rope 4.

The abnormal variation detection unit 22 shown in FIG. 9 is an example of the abnormal variation detection unit. The abnormal variation detection unit 22 may include a non-linear filter in order to extract the signal component in the characteristic frequency band. The signal component in the characteristic frequency band may be extracted by applying an algorithm of an adaptive filter to the abnormal variation detection unit 22.

The abnormal variation detection unit 22 determines whether or not the variation of the torque signal has exceeded a threshold value Th1. In the example shown in the present embodiment, the variation of the torque signal is synonymous with a band-pass filter output. That is, the abnormal variation detection unit 22 determines whether or not the band-pass filter output has exceeded the threshold value Th1. The threshold value Th1 that is compared with the band-pass filter output is pre-stored in, for example, the storage unit 20. When the band-pass filter output is greater than the threshold value Th1, the abnormal variation detection unit 22 detects occurrence of the abnormal variation in the sensor signal (Yes in S101).

The car position detection unit 21 detects a position of the car 1. The car position detection unit 21 detects the position of the car 1 on the basis of, for example, the rotation signal outputted from the encoder 18. The method for detecting the position used by the car position detection unit 21 is not limited to the example shown in the present embodiment. For example, the traction machine 11 includes an encoder. The encoder included in the traction machine 11 is also an example of the sensor that outputs the signal corresponding to the position of the car 1. The car position detection unit 21 may detect the position of the car 1 on the basis of an encoder signal from the traction machine 11. The governor 15 may have a function of detecting the position of the car 1. The traction machine 11 may have the function of detecting the position of the car 1. In such cases, a signal indicative of the position of the car 1 is inputted to the controller 13.

When the abnormal variation detection unit 22 detects the occurrence of the abnormal variation in the sensor signal, the car position detection unit 21 detects the position of the car 1 at the time of the occurrence of the variation (S102). The abnormal variation detection unit 22 determines whether or not the position detected in S102 is identical to a position stored in the storage unit 20 (S103). When the position detected in S102 is not identical to the position stored in the storage unit 20 (No in S103), the abnormal variation detection unit 22 causes the storage unit 20 to store the position of the car 1 at the time of the occurrence of the abnormal variation in the sensor signal in association with a determination score corresponding to the position (S104). In S104, the determination score is set to an initial value. The determination score is a score for determining whether or not the broken portion 4$c$ is present in the main rope 4. The break determination unit 24 determines whether or not the broken portion 4*c* is present in the main rope 4 on the basis of the determination score stored in the storage unit 20 (S106).

FIG. 11 is a view for explaining the functions of the break detection device. Hereinbelow, functions of the arithmetic unit 23 and the break determination unit 24 will be described in detail. FIG. 11(*a*) shows a position of the car 1. FIG. 11(*b*) shows torque of the traction machine 11. FIG. 11(*c*) shows an absolute value of the band-pass filter output. FIG. 11(*d*) shows an example of a change of the determination score.

In an example shown in FIG. 11, the car 1 makes two round trips between the bottom floor and the position P. The car 1 passes the position $P_1$ at time $t_1$, time $t_2$, time $t_3$, and time $t_4$. In addition, FIG. 11 shows an example in which the broken portion 4*c* is present in the main rope 4. The broken portion 4*c* passes through the return sheave 9 at time $t_1$, time $t_2$, time $t_3$, and time $t_4$. As described above, even when the broken portion 4*c* is present in the main rope 4, the broken portion 4*c* does not always come into contact with the rope guide 19. In the example shown in FIG. 11, the broken portion 4*c* comes into contact with the rope guide 19 at time $t_1$, time $t_3$, and time $t_4$. The broken portion 4*c* does not come into contact with the rope guide 19 at time $t_2$.

For example, when the broken portion 4*c* comes into contact with the rope guide 19 at time $t_1$, the band-pass filter output exceeds the threshold value Th1. With this, the abnormal variation detection unit 22 detects the occurrence of the abnormal variation in the sensor signal (Yes in S101). The car position detection unit 21 detects the position $P_1$ as the position of the car 1 at the time of the occurrence of the abnormal variation in the sensor signal (S102). At time $t_1$, the position $P_1$ is not stored in the storage unit 20 (No in S103). Consequently, the abnormal variation detection unit 22 causes the storage unit 20 to store the position $P_1$ in association with the determination score. FIG. 11 shows an example in which the initial value of the determination score is 5.

The break determination unit 24 determines whether or not the determination score stored in the storage unit 20 is greater than a threshold value Th2. The threshold value Th2 that is compared with the determination score is pre-stored in, for example, the storage unit 20. FIG. 11 shows an example in which the threshold value Th2 is 10. At time $t_1$, the determination score of the position $P_1$ is not greater than the threshold value Th2. When the determination score is not greater than the threshold value Th2, the break determination unit 24 determines that the broken portion 4*c* is not present in the main rope 4 (No in S106). When the break determination unit 24 determines that the broken portion 4*c* is not present in the main rope 4, the operation control unit 25 controls a normal operation (S109). The normal operation is an operation in which the car 1 is caused to respond to a registered hall call and a registered car call.

The controller 13 performs the process flow shown in FIG. 10 at regular intervals. During a time period immediately after time $t_1$, the abnormal variation detection unit 22 does not detect the occurrence of the abnormal variation in the sensor signal (No in S101). In such a case, it is determined whether or not the car 1 has passed the position identical to the position at the time of the occurrence of the abnormal variation in the sensor signal again (S107). In the example shown in FIG. 11, it is determined whether or not the car 1 has passed the position $P_1$. No is given in the determination in each of S101 and S107 until the car 1 passes the position $P_1$ again at time $t_2$.

The car 1 passes the position $P_1$ again at time $t_2$. When the abnormal variation detection unit 22 does not detect the occurrence of the abnormal variation in the sensor signal when the car 1 passes the position stored in the storage unit 20, Yes is given in the determination in S107. In the example shown in FIG. 11, Yes is given in the determination in S107 at time $t_2$. In such a case, the arithmetic unit 23 decreases the determination score of the above position stored in the storage unit 20 (S108). In the example shown in FIG. 11, the arithmetic unit 23 subtracts a specific value $C_2$ from the determination score of Use position $P_1$ stored in the storage unit 20. FIG. 11 shows an example in which the value $C_2$ to be subtracted is 1.

The car 1 passes the position $P_1$ again at time $t_3$. At this point, the broken portion 4*c* comes into contact with the rope guide 19. When the broken portion 4*c* comes into contact with the rope guide 19, the band-pass filter output exceeds the threshold value Th1. The abnormal variation detection unit 22 detects the occurrence of the abnormal variation in the sensor signal at time $t_3$ (Yes in S101). The car position detection unit 21 detects the position $P_1$ as the position of the car 1 at the time of the occurrence of the abnormal variation in the sensor signal (S102).

When the abnormal variation detection unit 22 detects the occurrence of the abnormal variation in the sensor signal when the car 1 passes the position stored in the storage unit 20, Yes is given in determination in S103. In the example shown in FIG. 11, Yes is given in the determination in S103 at time $t_3$. In such a case, the arithmetic unit 23 increases the determination score of the above position stored in the storage unit 20 (S105). In the example shown in FIG. 11, the arithmetic unit 23 adds a specific value $C_1$ to the determination score of the position $P_1$ stored in the storage unit 20. FIG. 11 shows an example in which the value $C_1$ to be added is 5.

When the arithmetic unit 23 increases the determination score, the break determination unit 24 determines whether or not the broken portion 4*c* is present in the main rope 4 (S106). In the example shown in FIG. 11, the break determination unit 24 determines whether or not the determination score stored in the storage unit 20 is greater than the threshold value Th2. At time $t_3$, the determination score of the position $P_1$ is not greater than the threshold value Th2. Consequently, at time $t_3$, the break determination unit 24 determines that the broken portion 4*c* is not present in the main rope 4 (No in S106). In this case, the operation control unit 25 controls the normal operation (S109).

Thereafter, the car 1 passes the position $P_1$ again at time $t_4$. At this point, the broken portion 4*c* comes into contact with the rope guide 19. When the broken portion 4*c* comes into contact with the rope guide 19, the band-pass filter output exceeds the threshold value Th1. The abnormal variation detection unit 22 detects the occurrence of the abnormal variation in the sensor signal at time $t_4$ (Yes in S101). The car position detection unit 21 detects the position $P_1$ as the position of the car 1 at the time of the occurrence of the abnormal variation in the sensor signal (S102).

In the example shown in FIG. 11, Yes is given in the determination in S103 at time $t_4$. The arithmetic unit 23 increases the determination score of the above position stored in the storage unit 20 (S105). For example, the arithmetic unit 23 adds the specific value $C_1$ to the determination score of the position $P_1$ stored in the storage unit 20. When the arithmetic unit 23 increases the determination score, the break determination unit 24 determines whether or not the broken portion 4*c* is present in the main rope 4 (S106). For example, the break determination unit 24 determines whether or not the determination score stored in the storage unit 20 is greater than the threshold value Th2. The determination score of the position $P_1$ becomes 14 at time $t_4$. When the determination score exceeds the threshold value Th2, the break determination unit 24 determines that the broken portion 4*c* is present in the main rope 4 (Yes in S106).

When the break determination unit 24 determines that the broken portion 4*c* is present in the main rope 4, the operation control unit 25, for example, stops the car 1 at the nearest floor (S110). In addition, when the break determination unit 24 determines that the broken portion 4*c* is present in the main rope 4, the notification unit 26 provides a notification to, for example, a management company of the elevator (S110).

In the example shown in the present embodiment, the presence of the broken portion 4*c* is detected by using the sensor having the output signal that varies when the vibration is generated in the main rope 4. As the sensor signal, it is possible to use, for example, the torque signal, the load signal, or the acceleration signal. As the sensor signal, a speed signal from the traction machine 11 may also be used. As the sensor signal, a deviation signal between a speed command value to the traction machine 11 and the speed signal from the traction machine 11 may also be used. Accordingly, it is not necessary to provide a sensor dedicated to the detection of the presence of the broken portion 4*c*. In addition, when at least one sensor is provided, it is possible to detect the presence of the broken portion 4*c*. It is not necessary to provide a large number of sensors for determining the presence or absence of the broken portion 4*c*. As a result, it is possible to simplify a configuration.

Note that a plurality of sensors may be used for determining the presence or absence of the broken portion 4*c*. For example, the presence of the broken portion 4*c* may be detected by using both of the torque signal from the traction machine 11 and the load signal from the load weighing device 12. In such a case, the process flow shown in FIG. 10 is performed on each sensor signal. For example, when the presence of the broken portion 4*c* is detected on the basis of any of the sensor signals, the operation shown in S110 is performed.

In the example shown in the present embodiment, when the abnormal variation occurs in the sensor signal again when the car 1 passes the position identical to the position when the abnormal variation has occurred in the sensor signal, the determination score is increased. When the determination score exceeds the threshold value Th2, it is determined that the broken portion 4*c* is present in the main rope 4. That is, it is determined whether or not the broken portion 4*c* is present in the main rope 4 on the basis of reproducibility of the car position when the abnormal variation has occurred in the sensor signal. Since the above determination is performed on the basis of the reproducibility of the car position, the threshold value Th2 is preferably a value greater than or equal to the sum of the initial value of the determination score and the value $C_1$ to be added. In the example shown in the present embodiment, the initial value of the determination score is equal to the value $C_1$ to be added. Consequently, the threshold value Th2 is preferably a value twice the value $C_1$ or greater. The initial value of the determination score may be different from the value $C_1$ to be added.

In the example shown in the present embodiment, when the abnormal variation does not occur in the sensor signal when the car 1 passes the position identical to the position when the abnormal variation has occurred in the sensor signal, the determination score is decreased. As described above, even when the broken portion 4*c* protrudes from the surface of the main rope 4, the broken portion 4*c* does not always come into contact with the rope guide. In the example shown in the present embodiment, even when a phenomenon in which the broken portion 4*c* comes or does not come into contact with the rope guide occurs, it is possible to determine that the broken portion 4*c* is present in the main rope 4 with high accuracy. In consideration of the fact that the orientation of the broken portion 4*c* is changed by the movement of the car 1, the value $C_2$ to be subtracted from the determination score is preferably a value greater than 0 and less than or equal to ½ of the initial value of the determination score. In the case where the initial value of the determination score is equal to the value $C_1$ to be added, the value $C_2$ is preferably a value greater than 0 and less than or equal to ½ of the value $C_1$. Note that, in the case where the determination score has a value less than or equal to 0 as a result of the decrease in S108 in FIG. 10, information on the position corresponding to the determination score may be deleted from the storage unit 20.

With regard to the threshold value Th1, the storage unit 20 may be caused to store a fixed value based on experience or the like. The threshold value Th1 may be set on the basis of the band-pass filter output obtained when the broken portion 4*c* is not present. For example, a value obtained by multiplying the maximum value of the band-pass filter output obtained when the broken portion 4*c* is not present by a constant is stored in the storage unit 20 as the threshold value Th1. An operation for setting the threshold value Th1 may be performed when the elevator device is installed. An operation for resetting the threshold value Th1 may be performed when the maintenance of the elevator device is performed or when there is no user.

In the example shown in the present embodiment, when the abnormal variation occurs in the sensor signal again when the car 1 passes the position identical to the position stored in the storage unit 20, the determination score is increased. When the abnormal variation does not occur in the sensor signal when the car 1 passes the position identical to the position stored in the storage unit 20, the determination score is decreased. Hereinbelow, an example of the determination that "the position is identical to the position stored in the storage unit 20" will be described with reference to FIG. 12 to FIG. 14.

Figure 12A:
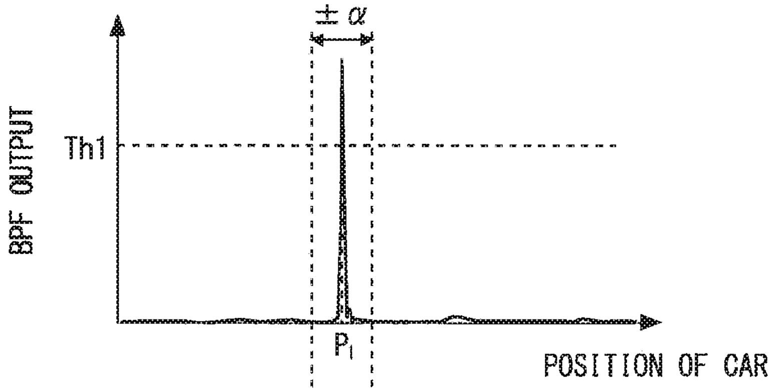
FIG. 12A is a view showing an example of a band-pass filter output corresponding to a car position.
Figure 12B:
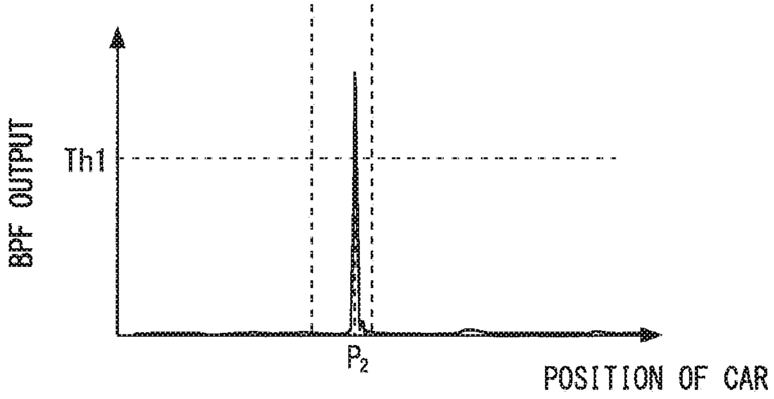
FIG. 12B is a view showing an example of the band-pass filter output corresponding to the car position.

FIG. 12 is a view showing examples of the band-pass filter output corresponding to the car position. The vertical axis in FIG. 12 indicates, for example, an absolute value. FIG. 12(*a*) shows a waveform when the band-pass filter output that is greater than the threshold value Th1 is detected for the first time. In an example shown in FIG. 12(*a*), a peak value of the band-pass filter output is detected when the car position is the position $P_1$. In this case, in S104 in FIG. 10, the position $P_1$ is stored in the storage unit 20 as the position of the car 1 at the time of the occurrence of the abnormal variation in the sensor signal.

FIG. 12(*b*) shows a waveform when the band-pass filter output that is greater than the threshold value Th1 is detected for the second time. In an example shown in FIG. 12(*b*), a peak value of the band-pass filter output is detected when the car position is a position $P_2$. In this case, when the position $P_2$ is in a specific range having the position $P_1$ as a median, it is determined that the car position when the abnormal variation is detected for the second time is identical to the car position when the abnormal variation is detected for the first time. That is, Yes is given in the determination in S103. For example, the position $P_2$ is within a range of $P_1 \pm \alpha$. FIG. 12(*b*) shows an example in which Yes is given in the determination in S103.

Figure 13A:
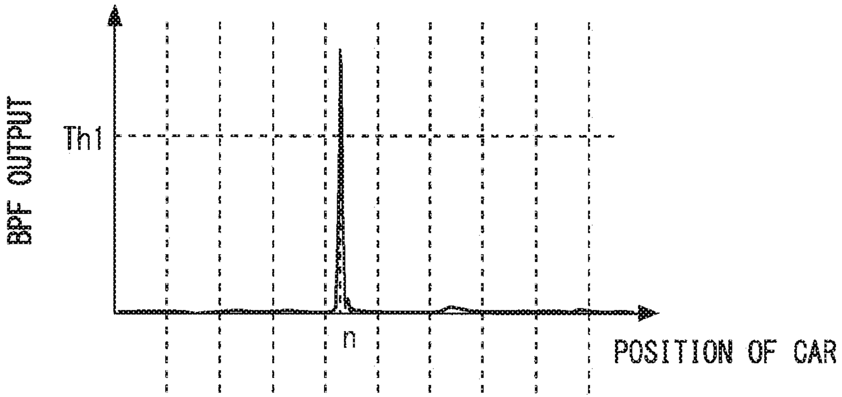
FIG. 13A is a view showing an example of the band-pass filter output corresponding to the car position.
Figure 13B:
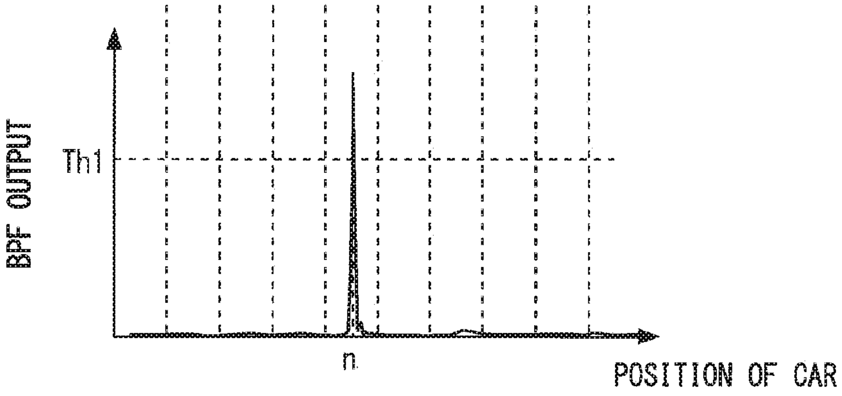
FIG. 13B is a view showing an example of the band-pass filter output corresponding to the car position.

FIG. 13 is a view showing examples of the band-pass filter output corresponding to the car position. The vertical axis in FIG. 13 indicates, for example, an absolute value. FIG. 13 is a view for explaining another example of the determination that "the positions are identical to each other". FIG. 13(*a*) shows a waveform when the band-pass filter output that is greater than the threshold value Th1 is detected for the first time. In an example shown in FIG. 13, an area in which the car 1 can move is divided into a specific number of sections. FIG. 13(*a*) shows an example in which the band-pass filter output that is greater than the threshold value Th1 is detected when the car 1 is in the n-th section. In this case, in S104 in FIG. 10, a section number n is stored in the storage unit 20 as the position of the car 1 at the time of the occurrence of the abnormal variation in the sensor signal.

FIG. 13(*b*) shows a waveform when the band-pass filter output that is greater than the threshold value Th1 is detected for the second time. In an example shown in FIG. 13(*b*), the band-pass filter output that is greater than the threshold value Th1 is detected when the car 1 is in the n-th section. In this case, the detected section number is identical to the section number stored in the storage unit 20, and hence it is determined that the car position when the abnormal variation is detected for the second time is identical to the car position when the abnormal variation is detected for the first time. That is, Yes is given in the determination in S103.

Figure 14A:
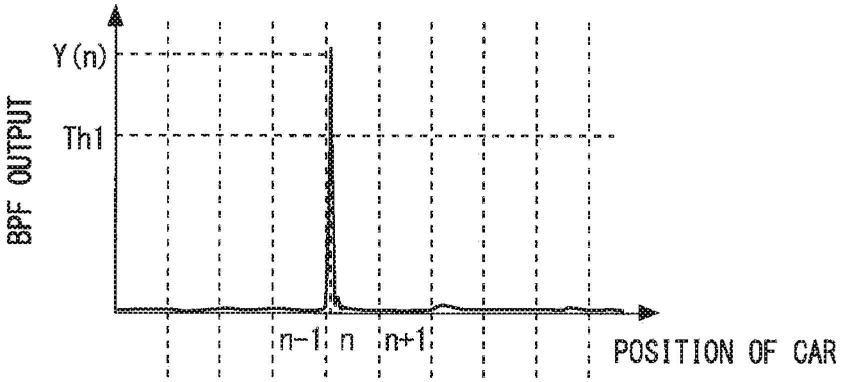
FIG. 14A is a view showing an example of the band-pass filter output corresponding to the car position.
Figure 14B:
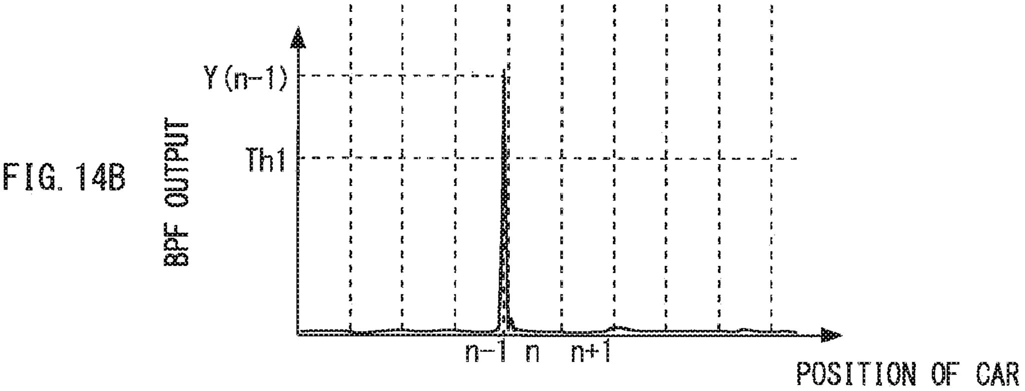
FIG. 14B is a view showing an example of the band-pass filter output corresponding to the car position.

FIG. 14 is a view showing examples of the band-pass filter output corresponding to the car position. The vertical axis in FIG. 14 indicates, for example, an absolute value. FIG. 14 is a view for explaining another example of the determination that "the positions are identical to each other". There are cases where the broken portion 4*c* protruding from the surface of the main rope 4 changes its position as the wire or the strand is untied. FIG. 14(*a*) shows a waveform when the band-pass filter output that is greater than the threshold value Th1 is detected for the first time. In an example shown in FIG. 14, similarly to the example shown in FIG. 13, an area in which the car 1 can move is divided into a specific number of sections. In an example shown in FIG. 14(*a*), the band-pass filter output that is greater than the threshold value Th1 is detected when the car 1 is in the n-th section.

FIG. 14(*b*) shows a waveform when the band-pass filter output that is greater than the threshold value Th1 is detected for the second time. In an example shown in FIG. 14(*b*), the band-pass filter output that is greater than the threshold value Th1 is detected when the car 1 is in the (n−1)-th section. The phenomenon shown in FIG. 14 can occur due to untying of the wire or the strand. In the example shown in FIG. 14, it is preferable to determine that the car position when the abnormal variation is detected for the second time is identical to the car position when the abnormal variation is detected for the first time. Accordingly, an evaluation method shown below may be used.

For example, when a band-pass filter output Y(n) that is greater than the threshold value Th1 is detected for the first time in a section n, in order to use the section n as the starting point of evaluation, a section number n is stored in the storage unit 20. Thereafter, when the car 1 moves in the section n, band-pass filter outputs obtained in three sections including sections prior and subsequent to the section n used as the starting point serve as evaluation targets. Specifically, the maximum value among the band-pass filter outputs obtained in the above three sections is used as an evaluation amount $\overline{Y}(n)$ in the section n, and is compared with the threshold value Th1. For example, the evaluation amount $\overline{Y}(n)$ is given by the following expression.

$$\overline{Y}(n)=\max\ (Y(n-1),Y(n),Y(n+1)).$$

In the example shown in FIG. 14, the first evaluation amount is given by $\overline{Y}(n)=\max(Y(n-1), Y(n), Y(n+1))=Y(n)$. The second evaluation amount is given by $\overline{Y}(n)=\max(Y(n-1), Y(n), Y(n+1))=Y(n-1)$. When the second evaluation amount $\overline{Y}(n)$ is grater than the threshold value Th1 (Yes in S103), the determination score is increased. When the evaluation amount $\overline{Y}(n)$ is not greater than the threshold value Th1 when the car 1 moves in the section n again (Yes in S107), the determination score is decreased. Also in this example, in the case where the determination score has a value less than or equal to 0 as a result of the decrease in S108 in FIG. 10, information on the position corresponding to the determination score may be deleted from the storage unit 20.

Hereinbelow, another example for determining the presence of the broken portion 4*c* in the main rope 4 with high accuracy will be described.

In the elevator device, when the car 1 starts to move, a transient response in speed control resulting from a difference between the mass of the car 1 and the mass of the counterweight 3 occurs. Consequently, during a time period immediately after the car 1 starts to move, the torque signal from the traction machine 11, the load signal from the load weighing device 12 and the like may vary. When the variation of the sensor signal is detected by the abnormal variation detection unit 22, it becomes impossible to determine whether or not the broken portion 4*c* is present in the main rope 4 with high accuracy.

To cope with this, during the time period immediately after the car 1 starts to move, the abnormal variation detection unit 22 does not need to detect the occurrence of the abnormal variation in the sensor signal. For example, during the time period immediately after the car 1 starts to move, the abnormal variation detection unit 22 may always output 0 as the band-pass filter output. As another example, during the time period immediately after the car 1 starts to move, the abnormal variation detection unit 22 may detect the occurrence of the abnormal variation in the case where the variation of the sensor signal exceeds a threshold value Th3. The threshold value Th3 is a value greater than the threshold value Th1. The time period immediately after the car 1 starts to move in the above examples denotes, for example, a time period from when the car 1 starts to move to when the speed of the car 1 reaches a speed $V_1$. The speed $V_1$ is pre-stored in the storage unit 20. The time period immediately after the car 1 starts to move may denote a time period from when the car 1 starts to move to when the acceleration of the car 1 becomes constant.

In addition, in the elevator device, a ripple occurs in the torque of the traction machine 11. When the torque ripple is detected by the abnormal variation detection unit 22, it becomes impossible to determine whether or not the broken portion 4*c* is present in the main rope 4 with high accuracy. Such an erroneous detection may occur during the time period immediately after the car 1 starts to move and during a time period immediately before the car 1 stops.

To cope with this, during the time period immediately after the car 1 starts to move and during the time period immediately before the car 1 stops, the abnormal variation detection unit 22 may detect the occurrence of the abnormal variation in the case where the variation of the sensor signal exceeds a threshold value Th4. The threshold value Th4 is a value greater than the threshold value Th1. Each of the time period immediately after the car 1 starts to move and the time period immediately before the car 1 stops denotes a time period in which the speed of the car 1 is lower than a speed $V_2$. The speed $V_2$ is pre-stored in the storage unit 20. For example, the speed $V_2$ is set to a speed at which the band of frequencies of the torque ripple of the traction machine 11 deviates from the band of the characteristic frequencies generated by contact of the broken portion 4*c* with the rope guide.

Figure 15:
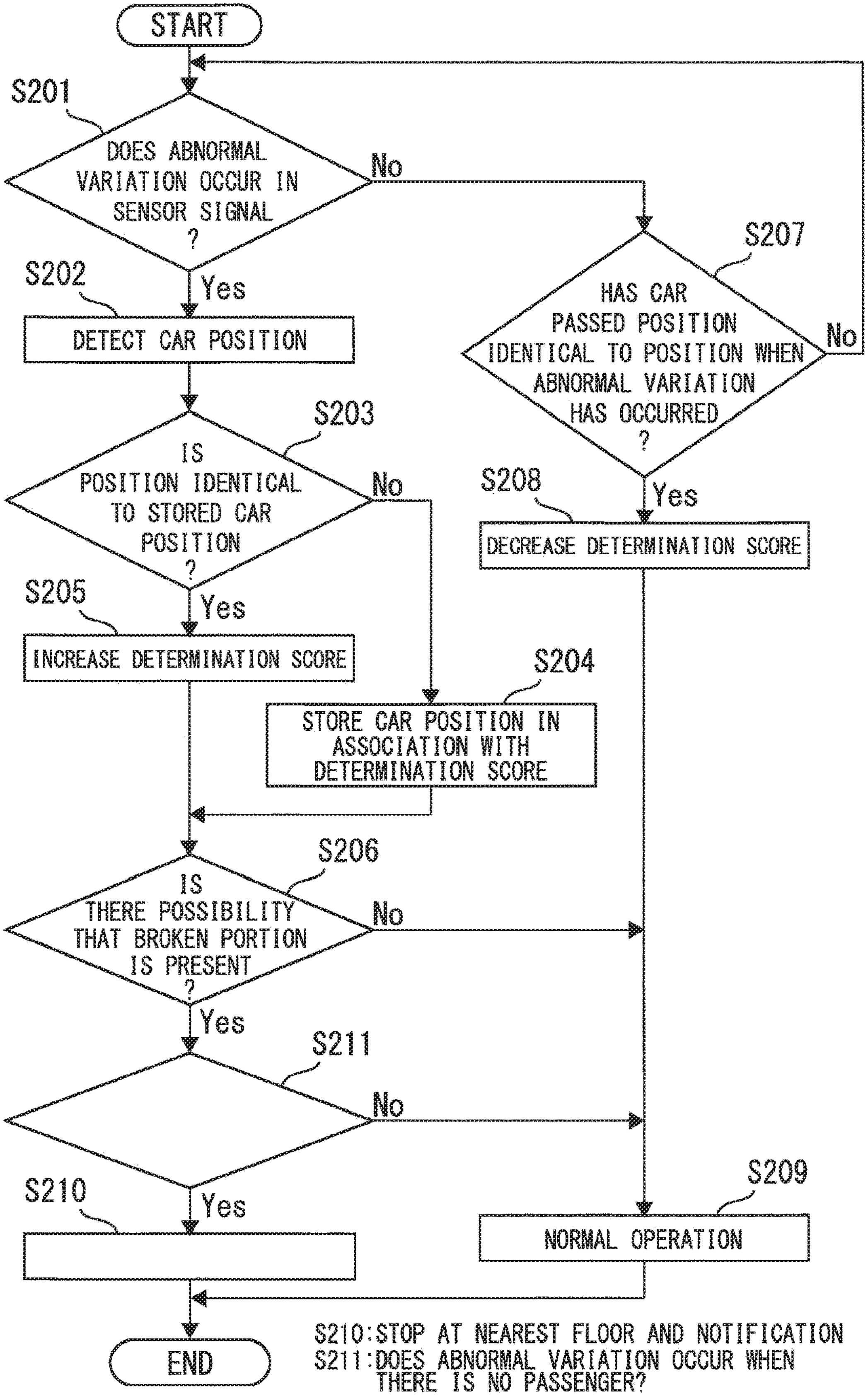
FIG. 15 is a flowchart showing another operation example of the break detection device according to Embodiment 1 of the present invention.

FIG. 15 is a flowchart showing another operation example of the break detection device according to Embodiment 1 of the present invention. Processes shown in S201 to S205 in FIG. 15 are identical to the processes shown in S101 to S105 in FIG. 10. Processes shown in S207 to S210 in FIG. 15 are identical to the processes shown in S107 to S110 in FIG. 10.

In S206 in FIG. 15, a process similar to the process performed in S106 in FIG. 10 is performed. That is, in S206, the break determination unit 24 determines whether or not the determination score stored in the storage unit 20 is greater than the threshold value Th2. When the determination score is greater than the threshold value Th2, the break determination unit 24 determines that there is a possibility that the broken portion 4*c* is present in the main rope 4 (Yes in S206). When the determination score is not greater than the threshold value Th2, the break determination unit 24 determines that there is no possibility that the broken portion 4*c* is present in the main rope 4 (No in S206). When the break determination unit 24 determines that there is no possibility that the broken portion 4*c* is present in the main rope 4, the operation control unit 25 controls the normal operation (S209).

In the case where there is a possibility that the broken portion 4*c* is present in the main rope 4, the break determination unit 24 then determines whether or not the abnormal variation occurs in the sensor signal at the position in a state in which no passenger is in the car 1 (S211). For example, the break determination unit 24 determines whether or not a passenger is in the car 1 on the basis of the load signal from the load weighing device 12. When no passenger is in the car 1, the break determination unit 24 allows the car 1 to pass the position when the determination score has exceeded the threshold value Th2. When the abnormal variation detection unit 22 detects the occurrence of the abnormal variation in the sensor signal when the car 1 with no passenger passes the above position (Yes in S211), the break determination unit 24 determines that the broken portion 4*c* is present in the main rope 4.

When the break determination unit 24 determines that the broken portion 4*c* is present in the main rope 4, the operation control unit 25, for example, stops the car 1 at the nearest floor (S210). In addition, when the break determination unit 24 determines that the broken portion 4*c* is present in the main rope 4, the notification unit 26 provides a notification to, for example, the management company of the elevator (S210). Note that the process in S211 may be performed while the normal operation is continued.

In the example shown in FIG. 15, it is possible to determine that the broken portion 4*c* is present in the main rope 4 in a state in which an influence of passengers in the car 1 is eliminated. The determination in S211 is performed in the state in which no passenger is in the car 1, and hence the detection of the abnormal variation may be performed by using a voice signal from an intercom included in the car 1.

Figure 16:
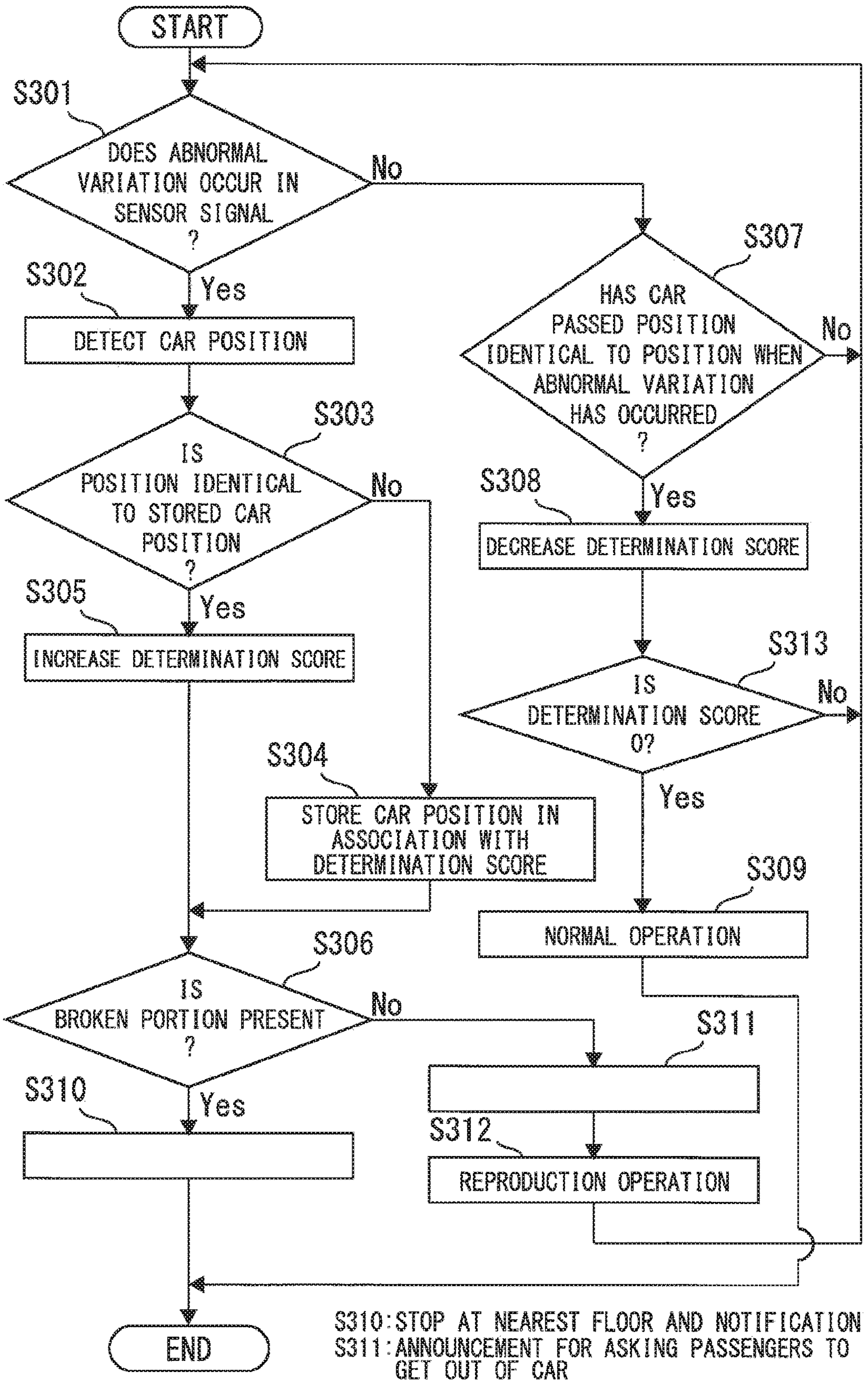
FIG. 16 is a flowchart showing another operation example of the break detection device according to Embodiment 1 of the invention.

FIG. 16 is a flowchart showing another operation example of the break detection device according to Embodiment 1 of the invention. Processes shown in S301 to S310 in FIG. 16 are identical to the processes shown in S101 to S110 in FIG. 10.

In the example shown in FIG. 16, when the position of the car 1 and the determination score are stored in the storage unit 20 in S304, the break determination unit 24 determines whether or not the broken portion 4*c* is present in the main rope 4 on the basis of the determination score stored in the storage unit 20 (S306). Specifically, the break determination unit 24 determines whether or not the determination score stored in the storage unit 20 is greater than the threshold value Th2. When the determination score is not greater than the threshold value Th2, the break determination unit 24 determines that the broken portion 4*c* is not present in the main rope 4 (No in S306).

When the break determination unit 24 determines that the broken portion 4*c* is not present in the main rope 4, the operation control unit 2S provides an announcement for asking passengers to get out of the car 1 (S311). For example, the operation control unit 25 determines whether or not a passenger is in the car 1 on the basis of the load signal from the load weighing device 12. When no passenger is in the car 1, the operation control unit 25 ends the normal operation, and starts a reproduction operation (S312). The reproduction operation is an operation for causing the car 1 to make a round trip in the section including the position stored in the storage unit 20. For example, the operation control unit 25 causes the car 1 to make a round trip between a departure floor and a destination floor when the abnormal variation detection unit 22 has detected the occurrence of the abnormal variation in the sensor signal.

No is given in the determination in S306 in the case where the determination score is greater than 0 and is not greater than the threshold value Th2. In the example shown in FIG. 16, by causing the car 1 to make a round trip actively in such a case, it becomes possible to early determine the presence or absence of the broken portion 4*c*.

When Yes is given in the determination in S307 during the execution of the reproduction operation, the determination score is decreased (S308). When the determination score is decreased, it is determined whether or not the determination score is 0 (S313). When the determination score is not 0, the reproduction operation is continued. When the determination score becomes 0, the reproduction operation is ended, and the normal operation is resumed (S309). That is, in the example shown in FIG. 16, the reproduction operation is continued until the determination score exceeds the threshold value Th2 or becomes 0. This is an example of the reproduction operation. In the reproduction operation, the car 1 may be caused to make a preset number of round trips between the departure floor and the destination floor.

The reproduction operation is performed in the state in which no passenger is in the car 1, and hence the detection of the abnormal variation may be performed by using the voice signal from the intercom included in the car 1. In addition, in the reproduction operation, in order to increase detection sensitivity, the abnormal variation detection unit 22 may detect the occurrence of the abnormal variation in the case where the variation of the sensor signal exceeds a threshold value Th5. The threshold value Th5 is a value less than the threshold value Th1.

Embodiment 2

In the present embodiment, points different from those in the examples disclosed in Embodiment 1 will be described in detail. The description of points identical to those in the examples disclosed in Embodiment 1 will be appropriately omitted. Similarly to the example shown in FIG. 9, the controller 13 in the present embodiment includes, for example, the storage unit 20, the car position detection unit 21, the abnormal variation detection unit 22, the arithmetic unit 23, the break determination unit 24, the operation control unit 25, and the notification unit 26. Also in an example shown in the present embodiment, the sensor signal is inputted to the controller 13. For example, the load signal outputted from the load weighing device 12 is inputted to the controller 13. The acceleration signal outputted from the accelerometer 14 is inputted to the controller 13. The torque signal outputted from the traction machine 11 is inputted to the controller 13. In addition, the rotation signal outputted from the encoder 18 is also inputted to the controller 13.

Figure 17:
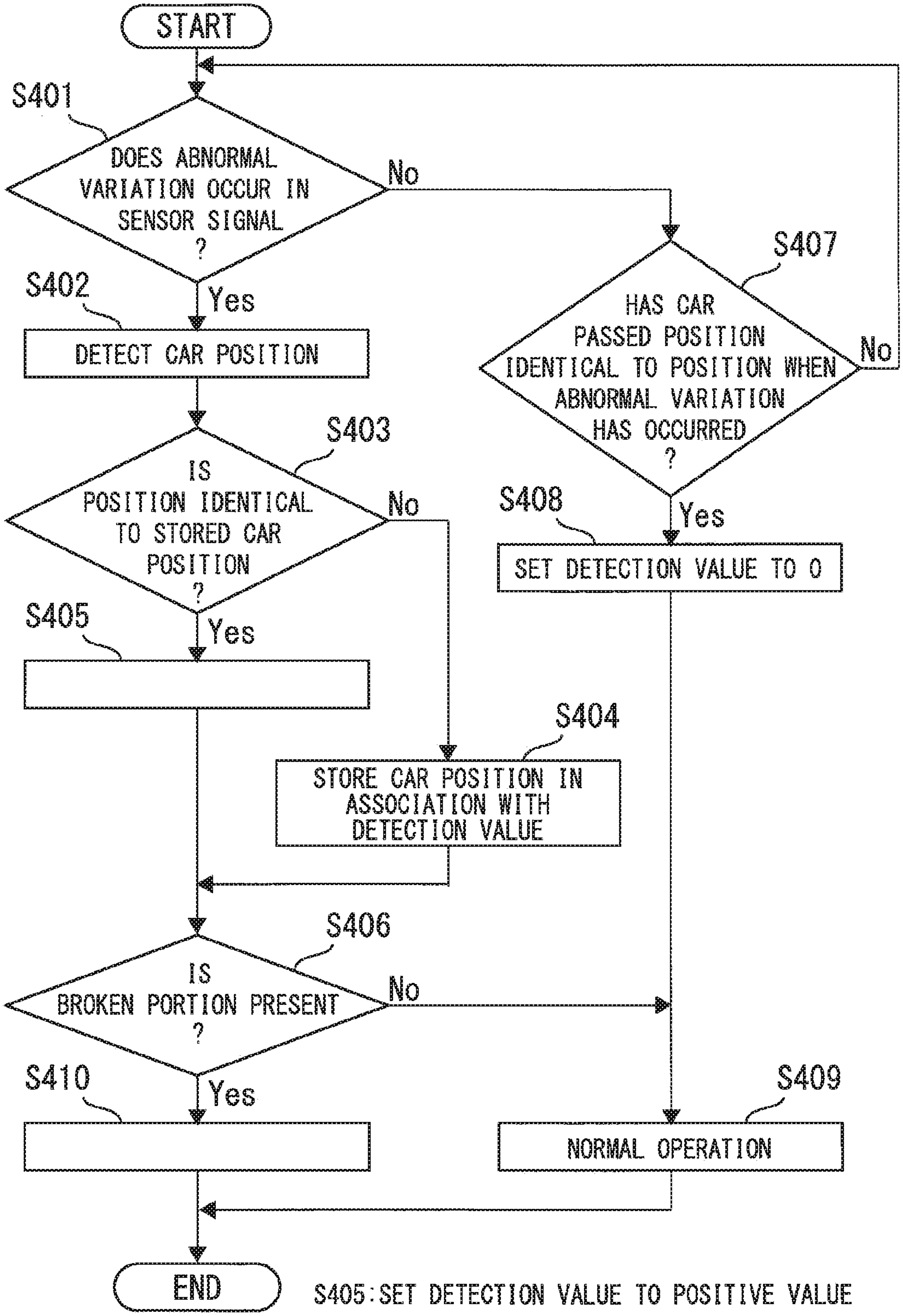
FIG. 17 is a flowchart showing an operation example of the break detection device according to Embodiment 2 of the invention.

Hereinbelow, functions and operations of the break detection device in the present embodiment will be described in detail with reference to FIG. 17 and FIG. 18. FIG. 17 is a flowchart showing an operation example of the break detection device according to Embodiment 2 of the invention.

The abnormal variation detection unit 22 determines whether or not the abnormal variation has occurred in the sensor signal (S401). In the example shown in the present embodiment as well, it is possible to use each of, for example, the load signal, the acceleration signal, and the torque signal as the sensor signal. Hereinbelow, an example in which the torque signal is used as the sensor signal will be described in detail. For example, the abnormal variation detection unit 22 determines whether or not the abnormal variation has occurred in the torque signal in S401. For example, the abnormal variation detection unit 22 performs a filtering process to the inputted torque signal in S401. The band-pass filter 27 extracts a signal component in a characteristic frequency band.

The abnormal variation detection unit 22 determines whether or not the variation of the torque signal has exceeded the threshold value Th1. In the example shown in the present embodiment as well, the variation of the torque signal is synonymous with the band-pass filter output. That is, the abnormal variation detection unit 22 determines whether or not the band-pass filter output has exceeded the threshold value Th1. The threshold value Th1 that is compared with the band-pass filter output is, for example, pre-stored in the storage unit 20. When the band-pass filter output is greater than the threshold value Th1, the abnormal variation detection unit 22 detects the occurrence of the abnormal variation in the sensor signal (Yes in S401).

The car position detection unit 21 detects a position of the car 1. The car position detection unit 21 detects the position of the car 1 on the basis of, for example, the rotation signal outputted from the encoder 18.

When the abnormal variation detection unit 22 detects the occurrence of the abnormal variation in the sensor signal, the car position detection unit 21 detects the position of the car 1 at the time of the occurrence of the variation (S402). The abnormal variation detection unit 22 determines whether or not the position detected in S402 is identical to the position stored in the storage unit 20 (S403). When the position detected in S402 is not identical to the position stored in the storage unit 20 (No in S403), the abnormal variation detection unit 22 causes the storage unit 20 to store the position of the car 1 at the time of the occurrence of the abnormal variation in the sensor signal in association with a detection value corresponding to the position (S404). The detection value is a value used for determining whether or not the broken portion 4*c* is present in the main rope 4. In the case where the occurrence of the abnormal variation in the sensor signal is detected by the abnormal variation detection unit 22, the detection value is set to a positive value. Consequently, in S404, the car position and the positive detection value are stored in association with each other. In the present embodiment, the break determination unit 24 determines whether or not the broken portion 4*c* is present in the main rope 4 on the basis of the frequency of the detection of the occurrence of the abnormal variation in the sensor signal performed by the abnormal variation detection unit 22 (S406).

Figures 18A, 18B, 18C, 18D, 18E:
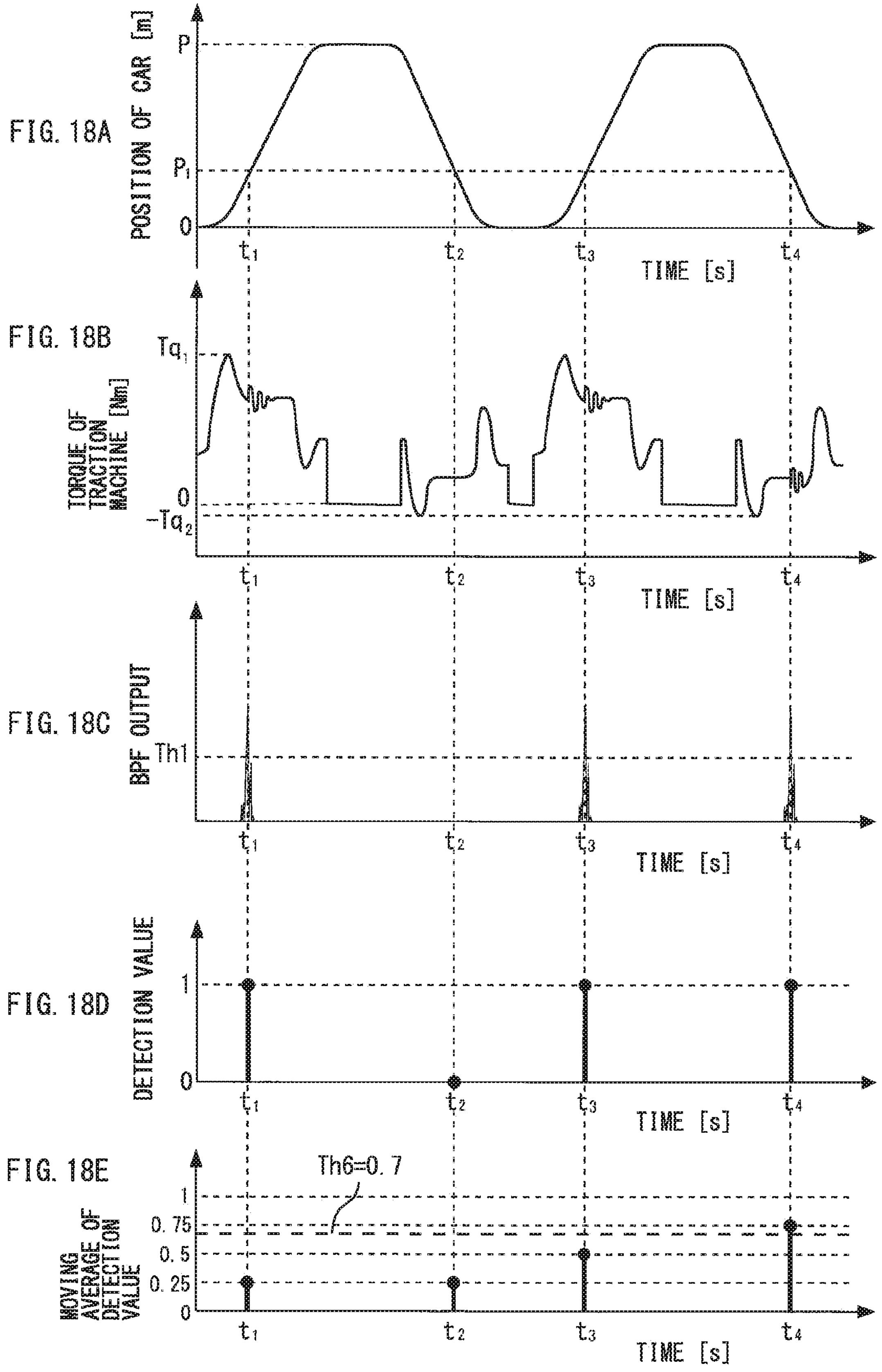
FIG. 18A shows the position of the car.
FIG. 18B shows the torque of the traction machine.
FIG. 18C shows the absolute value of the band-pass filter output.
FIG. 18D shows a set detection value.
FIG. 18E shows a moving average of the detection value.

FIG. 18 is a view for explaining the functions of the break detection device. Hereinbelow, the functions of the arithmetic unit 23 and the break determination unit 24 will be described in detail. FIG. 18(*a*) shows the position of the car 1. FIG. 18(*b*) shows the torque of the traction machine 11. FIG. 18(*c*) shows the absolute value of the band-pass filter output. FIG. 18(*d*) shows the set detection value. FIG. 18(*e*) shows a moving average of the detection value.

In an example shown in FIG. 18, the car 1 makes two round trips between the bottom floor and the position P. The car 1 passes the position $P_1$ at time $t_1$, time $t_2$, time $t_3$, and time $t_4$. In addition, FIG. 18 shows an example in which the broken portion 4*c* is present in the main rope 4. The broken portion 4*c* passes through the return sheave 9 at time $t_1$, time $t_2$, time $t_3$, and time $t_4$. As described above, even when the broken portion 4*c* is present in the main rope 4, the broken portion 4*c* does not always come into contact with the rope guide 19. In the example shown in FIG. 18, the broken portion 4*c* comes into contact with the rope guide 19 at time $t_1$, time $t_3$, and time $t_4$. The broken portion 4*c* does not come into contact with the rope guide 19 at time $t_2$.

For example, when the broken portion 4*c* comes into contact with the rope guide 19 at time $t_1$, the band-pass filter output exceeds the threshold value Th1. With this, the abnormal variation detection unit 22 detects the occurrence of the abnormal variation in the sensor signal (Yes in S401). The car position detection unit 21 detects the position $P_1$ as the position of the car 1 at the time of the occurrence of the abnormal variation in the sensor signal (S402). At time $t_1$, the position $P_1$ is not stored in the storage unit 20 (No in S403). Consequently, the abnormal variation detection unit 22 causes the storage unit 20 to store the position $P_1$ in association with the positive detection value. FIG. 18 shows an example in which the detection value is set to 1 in the case where the occurrence of the abnormal variation in the sensor signal is detected by the abnormal variation detection unit 22.

The arithmetic unit 23 calculates the frequency of the detection of the occurrence of the abnormal variation performed by the abnormal variation detection unit 22 when the car 1 passes the position stored in the storage unit 20. FIG. 18 shows an example in which the arithmetic unit 23 calculates the moving average of the detection value as the above frequency.

The break determination unit 24 determines whether or not the broken portion 4*c* is present in the main rope 4 on the basis of the moving average calculated by the arithmetic unit 23. FIG. 18 shows an example in which the arithmetic unit 23 calculates the moving average when the car 1 has passed the same position four times. In the example shown in FIG. 18, the calculated moving average at time $t_1$ is 0.25. The break determination unit 24 determines whether or not the moving average calculated by the arithmetic unit 23 is greater than a threshold value Th6. The threshold value Th6 that is compared with the moving average is, for example, pre-stored in the storage unit 20. FIG. 18 shows an example in which the threshold value Th6 is 0.7. At time $t_1$, the moving average of the detection value at the position $P_1$ is not greater than the threshold value Th6. When the moving average is not greater than the threshold value Th6, the break determination unit 24 determines that the broken portion 4*c* is not present in the main rope 4 (No in S406). When the break determination unit 24 determines that the broken portion 4*c* is not present in the main rope 4, the operation control unit 25 controls the normal operation (S409).

The controller 13 performs the process flow shown in FIG. 17 at regular intervals. During a time period immediately after time $t_1$, the abnormal variation detection unit 22 does not detect the occurrence of the abnormal variation in the sensor signal (No in S401). In such a case, it is determined whether or not the car 1 has passed the position identical to the position when the abnormal variation has occurred in the sensor signal again (S407). In the example shown in FIG. 18, it is determined whether or not the car 1 has passed the position $P_1$. No is given in the determination in each of S401 and S407 until the car 1 passes the position $P_1$ again at time $t_2$.

The car 1 passes the position $P_1$ again at time $t_2$. When the abnormal variation detection unit 22 does not detect the occurrence of the abnormal variation in the sensor signal when the car 1 passes the position stored in the storage unit 20, Yes is given in the determination in S407. In the example shown in FIG. 18, Yes is given in the determination in S407 at time $t_2$. In such a case, the detection value at the above position is set to 0 (S408). For example, the abnormal variation detection unit 22 causes the storage unit 20 to store 0 as a new detection value at the position $P_1$ at time $t_2$.

The car 1 passes the position $P_1$ again at time $t_3$. At this point, the broken portion 4*c* comes into contact with the rope guide 19. When the broken portion 4*c* comes into contact with the rope guide 19, the band-pass filter output exceeds the threshold value Th1. The abnormal variation detection unit 22 detects the occurrence of the abnormal variation in the sensor signal at time $t_3$ (Yes in S401). The car position detection unit 21 detects the position $P_1$ as the position of the car 1 at the time of the occurrence of the abnormal variation in the sensor signal (S402).

When the abnormal variation detection unit 22 detects the occurrence of the abnormal variation in the sensor signal when the car 1 passes the position stored in the storage unit 20, Yes is given in the determination in S403. In the example shown in FIG. 18, Yes is given in the determination in S403 at time $t_3$. In such a case, the detection value at the above position is set to the positive value (S405). For example, at time $t_3$, the abnormal variation detection unit 22 causes the storage unit 20 to store 1 as a new detection value at the position $P_1$.

When the new detection value is stored in the storage unit 20, the arithmetic unit 23 calculates the moving average of the detection value at the above position. In the example shown in FIG. 18, the arithmetic unit 23 calculates the moving average of the detection value at the position $P_1$. For example, the calculated moving average at time $t_2$ is 0.25. The calculated moving average at time $t_3$ is 0.5. The break determination unit 24 determines whether or not the moving average calculated by the arithmetic unit 23 is greater than the threshold value Th6. At time $t_2$, the moving average of the detection value at the position $P_1$ is not greater than the threshold value Th6. At time $t_3$, the moving average of the detection value at the position $P_1$ is not greater than the threshold value Th6. Consequently, the operation control unit 25 controls the normal operation (S409).

Thereafter, the car 1 passes the position $P_1$ again at time $t_4$. At this point, the broken portion 4*c* comes into contact with the rope guide 19. When the broken portion 4*c* comes into contact with the rope guide 19, the band-pass filter output exceeds the threshold value Th1. The abnormal variation detection unit 22 detects the occurrence of the abnormal variation in the sensor signal at time $t_1$ (Yes in S401). The car position detection unit 21 detects the position $P_1$ as the position of the car 1 at the time of the occurrence of the abnormal variation in the sensor signal (S402).

In the example shown in FIG. 18, Yes is given in the determination in S403 at time $t_4$. In such a case, the detection value at the above position is set to the positive value (S405). For example, the abnormal variation detection unit 22 causes the storage unit 20 to store 1 as a new detection value at the position $P_1$ at time $t_4$. In addition, the arithmetic unit 23 calculates the moving average of the detection value at the position $P_1$. For example, the calculated moving average at time $t_4$ is 0.75. When the moving average is calculated by the arithmetic unit 23, the break determination unit 24 determines whether or not the broken portion 4*c* is present in toe main rope 4 (S406). In the example shown in FIG. 18, the break determination unit 24 determines whether or not the moving average calculated by the arithmetic unit 23 is greater than the threshold value Th6. The moving average of the detection value at the position $P_1$ is 0.75 at time $t_4$. When the moving average calculated by the arithmetic unit 23 exceeds the threshold value Th6, the break determination unit 24 determines that the broken portion 4*c* is present in the main rope 4 (Yes in S406).

When the break determination unit 24 determines that the broken portion 4*c* is present in the main rope 4, the operation control unit 25, for example, stops the car 1 at the nearest floor (S410). In addition, when the break determination unit 24 determines that the broken portion 4*c* is present in the main rope 4, the notification unit 26 provides a notification to, for example, toe management company of the elevator (S410).

In the example shown in the present embodiment as well, it is possible to obtain effects similar to those of the example shown in Embodiment 1. For example, in the example shown in the present embodiment, it is not necessary to provide a large number of sensors for determining the presence or absence of the broken portion 4*c*. Consequently, it is possible to simplify the configuration. In addition, in the example shown in the present embodiment, even when the phenomenon in which the broken portion 4*c* comes or does not come into contact with the rope guide occurs, it is possible to determine that the broken portion 4*c* is present in the main rope 4 with high accuracy.

Any of the functions disclosed in Embodiment 1 may be applied to the break detection device disclosed in the present embodiment. For example, during the time period immediately after the car 1 starts to move, the abnormal variation detection unit 22 may always output 0 as the band-pass filter output. During the time period immediately after the car 1 starts to move, the abnormal variation detection unit 22 may detect the occurrence of the abnormal variation in the case where the variation of the sensor signal exceeds the threshold value Th3. In addition, during the time period immediately after the car 1 starts to move and during the time period immediately before the car 1 stops, the abnormal variation detection unit 22 may detect the occurrence of the abnormal variation in the case where the variation of the sensor signal exceeds the threshold value Th4.

Figure 19:
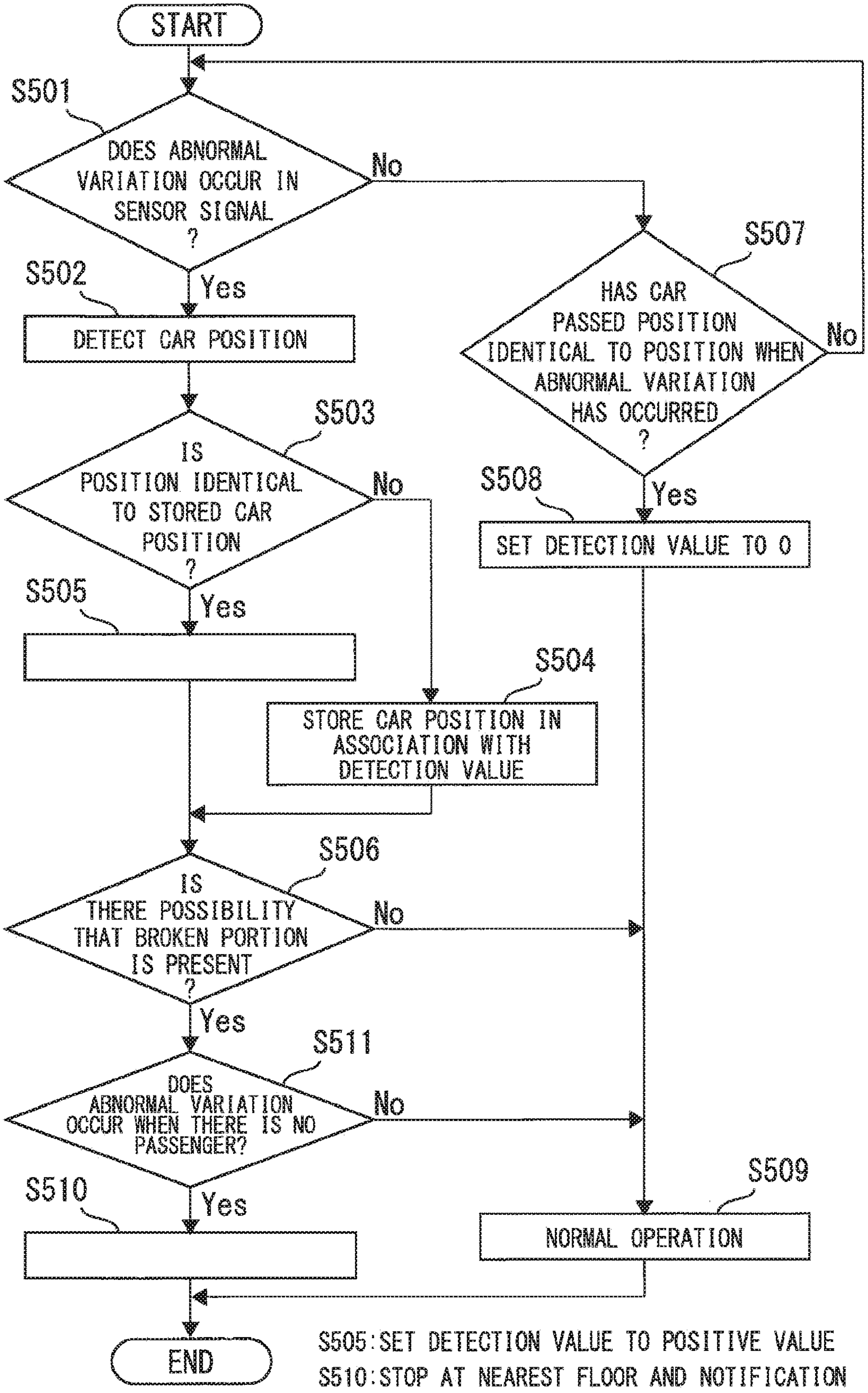
FIG. 19 is a flowchart showing another operation example of the break detection device according to Embodiment 2 of the present invention.

FIG. 19 is a flowchart showing another operation example of the break detection device according to Embodiment 2 of the present invention. Processes shown in S501 to SS05 in FIG. 19 are identical to the processes shown in S401 to S405 in FIG. 17. Processes shown in S507 to S510 in FIG. 19 are identical to the processes shown in S507 to S510 in FIG. 17.

In S506 in FIG. 19, a process similar to the process performed in S406 in FIG. 17 is performed. That is, in S506, the break determination unit 24 determines whether or not the moving average calculated by the arithmetic unit 23 is greater than the threshold value Th6. When the moving average is greater than the threshold value Th6, the break determination unit 24 determines that there is a possibility that the broken portion 4*c* is present in the main rope 4 (Yes in S506). When the moving average is not greater than the threshold value Th6, the break determination unit 24 determines that there is no possibility that the broken portion 4*c* is present in the main rope 4 (No in S506). When the break determination unit 24 determines that there is no possibility that the broken portion 4*c* is present in the main rope 4, the operation control unit 25 controls the normal operation (S509).

In the case where there is a possibility that the broken portion 4*c* is present in the main rope 4, the break determination unit 24 then determines whether or not the abnormal variation occurs in the sensor signal at the corresponding position in the state in which no passenger is in the car 1 (S511). For example, the break determination unit 24 determines whether or not a passenger is in the car 1 on the basis of the load signal from the load weighing device 12. When no passenger is in the car 1, the break determination unit 24 allows the car 1 to pass the position when the moving average has exceeded the threshold value Th6. When the abnormal variation detection unit 22 detects the occurrence of the abnormal variation in the sensor signal when the car 1 with no passenger passes the above position (Yes in S511), the break determination unit 24 determines that the broken portion 4*c* is present in the main rope 4.

When the break determination unit 24 determines that the broken portion 4*c* is present in the main rope 4, the operation control unit 25, for example, stops the car 1 at the nearest floor (S510). In addition, when the break determination unit 24 determines that the broken portion 4*c* is present in the main rope 4, the notification unit 26 provides a notification to, for example, the management company of the elevator (S510). Note that the process in S511 may be performed while the normal operation is continued.

In the example shown in FIG. 19, it is possible to determine that the broken portion 4*c* is present in the main rope 4 in the state in which the influence of passengers in the car 1 is eliminated. The determination in S511 is performed in the state in which no passenger is in the car 1, and hence the detection of the abnormal variation may be performed by using the voice signal from the intercom included in the car 1.

Figure 20:
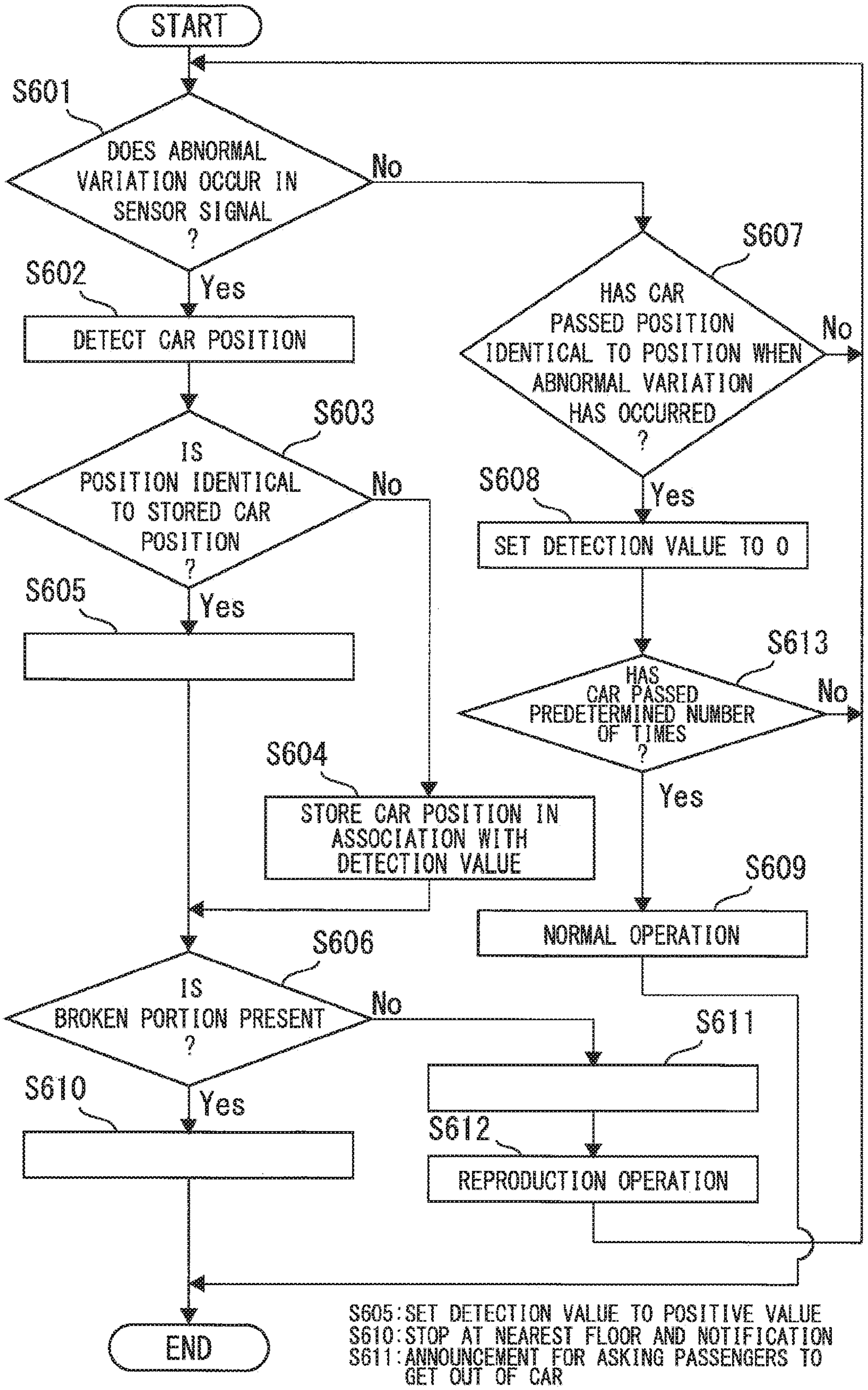
FIG. 20 is a flowchart showing another operation example of the break detection device according to Embodiment 2 of the present invention.

FIG. 20 is a flowchart showing another operation example of the break detection device according to Embodiment 2 of the present invention. Processes shown in S601 to S610 in FIG. 20 are identical to the processes shown in S401 to S410 in FIG. 17.

In the example shown in FIG. 20, when the position of the car 1 and the positive detection value are stored in the storage unit 20 in S604, the break determination unit 24 determines whether or not the broken portion 4*c* is present in the main rope 4 (S606). The break determination unit 24 performs the above determination on the basis of the frequency of the detection of the occurrence of the abnormal variation performed by the abnormal variation detection unit 22 when the car 1 passes the above position. Specifically, the arithmetic unit 23 calculates the moving average of the detection value at the above position. The break determination unit 24 determines whether or not the moving average calculated by the arithmetic unit 23 is greater than the threshold value Th6. When the moving average is not greater than the threshold value Th6, the break determination unit 24 determines that the broken portion 4*c* is not present in the main rope 4 (No in S606).

When the break determination unit 24 determines that the broken portion 4*c* is not present in the main rope 4, the operation control unit 25 provides an announcement for asking passengers to get out of the car 1 (S611). For example, the operation control unit 25 determines whether or not a passenger is in the car 1 on the basis of the load signal from the load weighing device 12. When no passenger is in the car 1, the operation control unit 25 ends the normal operation, and starts the reproduction operation (S612). The reproduction operation is the operation for causing the car 1 to make a round trip in the section including the position stored in the storage unit 20. For example, the operation control unit 25 causes the car 1 to make a round trip between a departure floor and a destination floor when the abnormal variation detection unit 22 has detected the occurrence of the abnormal variation in the sensor signal.

No is given in the determination in S606 in the case where the moving average is greater than 0 and is not greater than the threshold value Th6. In the example shown in FIG. 20, by causing the car 1 to make a round trip actively in such a case, it becomes possible to early determine the presence or absence of the broken portion 4*c*.

When Yes is given in the determination in S607 during the execution of the reproduction operation, the detection value at the corresponding position is set to 0 (S608). When the detection value is set to 0, it is determined whether or not the car 1 has passed the above position a predetermined number of times in the reproduction operation (S613). When the number of times the car 1 has passed the above position in the reproduction operation does not reach the predetermined number of times, the reproduction operation is continued. When the car 1 passes the above position the predetermined number of times in the reproduction operation, the reproduction operation is ended, and the normal operation is presumed (S609). That is, in the example shown in FIG. 20, the reproduction operation is continued until the moving average exceeds the threshold value Th6 or the number of times the car has passed the above position reaches the predetermined number of times.

The reproduction operation is performed in the state in which no passenger is in the car 1, and hence the detection of the abnormal variation may be performed by using the voice signal from the intercom included in the car 1. In addition, in the reproduction operation, in order to increase detection sensitivity, the abnormal variation detection unit 22 may detect the occurrence of the abnormal variation in the case where the variation of the sensor signal exceeds the threshold value Th5. The threshold value Th5 is a value less than the threshold value Th1.

In each of Embodiment 1 and Embodiment 2, the example in which the break detection device detects the broken portion 4*c* present in the main rope 4 has been described. This is an example of the detection performed by the break detection device. The break detection device may detect the broken portion present in another rope. For example, the break detection device may detect the broken portion present in a compensating rope or a governor rope. The rope of which the presence of the broken portion is detected by the break detection device may be coated with resin.

Figure 21:
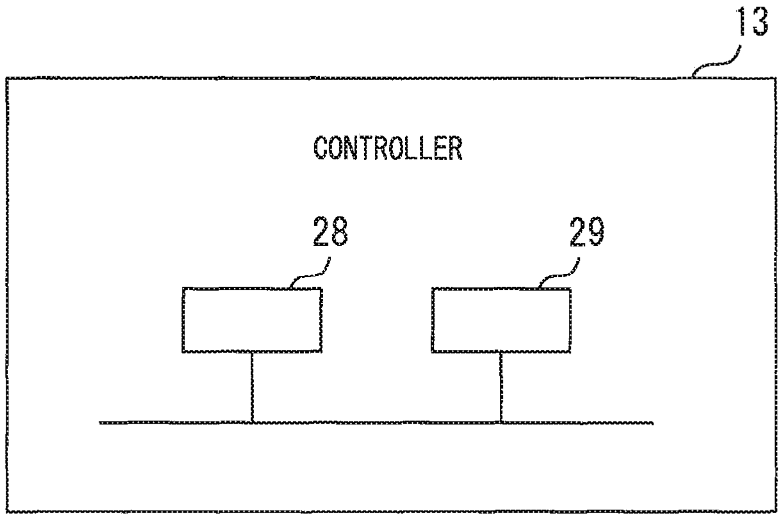
FIG. 21 is a view showing a hardware configuration of a controller.

The individual units indicated by the reference numerals 20 to 26 represent the functions of the controller 13. FIG. 21 is a view showing a hardware configuration of the controller 13. The controller 13 includes processing circuitry including, for example, a processor 28 and a memory 29 as a hardware resource. The function of the storage unit 20 is implemented by the memory 29. The controller device 13 implements the functions of the individual units indicated by the reference numerals 20 to 26 by executing a program stored in the memory 29 using the processor 28.

The processor 28 is also referred to at a CPU (Central Processing Unit), a central processor, a processing device, an arithmetic device, a microprocessor, a microcomputer, or a DSP. As the memory 29, a semiconductor memory, a magnetic disk, a flexible disk, an optical disk, a compact disc, a minidisc, or a DVD may be used. The semiconductor memories that can be used include a RAM, a ROM, a flash memory, an EPROM, an EEPROM and the like.

Part or all of the functions of the controller 13 may be implemented by hardware. As the hardware implementing the functions of the controller 13, a single circuit, a composite circuit, a programmed processor, a parallel-programmed processor, an ASIC, an FPGA, or a combination thereof may be used.

INDUSTRIAL APPLICABILITY

The break detection device according to the present invention can be applied to an elevator device that uses a rope in which a break of a wire or a strand can occur.

REFERENCE SIGNS LIST

1 car, 2 shaft, 3 counterweight, 4 main rope, 4*c* broken portion, 5 suspension sheave, 6 suspension sheave, 7 return sheave, 8 driving sheave, 9 return sheave, 10 suspension sheave, 11 traction machine, 12 load weighing device, 13 controller, 14 accelerometer, 15 governor, 16 governor rope, 17 governor sheave, 18 encoder, 19 rope guide, 20 storage unit, 21 car position detection unit, 22 abnormal variation detection unit, 23 arithmetic unit, 24 break determination unit, 25 operation control unit, 26 notification unit, 27 band-pass filter, 28 processor, 29 memory

The invention claimed is:

1. A break detection device comprising:

a sensor having an output signal, the output signal varying in response to vibration being generated in a rope of an elevator; and circuitry configured to:

detect an occurrence of an abnormal variation in the output signal from the sensor;

store, in response to the occurrence of the abnormal variation being detected, a position of a car of the elevator at a time of the occurrence of the abnormal variation in association with a determination score;

increase the determination score in response to the occurrence of the abnormal variation being detected and the car passing the stored position;

decrease the determination score in response to the occurrence of the abnormal variation being not detected and the car passing the stored position again; and determine whether or not a broken portion is present in the rope on the basis of the determination score.

2. The break detection device according to claim 1, wherein:

the circuitry is further configured to detect the occurrence of the abnormal variation in response to the variation of the output signal from the sensor exceeding a first threshold value.

3. The break detection device according to claim 1, wherein:

the circuitry is further configured to determine that the broken portion is present in the rope in response to the determination score exceeding a first threshold value.

4. The break detection device according to claim 3, wherein:

the circuitry is further configured to add a specific value to the determination score in response to the occurrence of the abnormal variation being detected and the car passing the stored position, and the first threshold value is a value greater than or equal to a sum of an initial value of the determination score and the specific value.

5. The break detection device according to claim 1, wherein:

the circuitry is further configured to subtract a specific value from the determination score in response to the occurrence of the abnormal variation being not detected and the car passing the stored position again, and the specific value is a value greater than 0 and less than or equal to ½ of an initial value of the determination score.

6. The break detection device according to claim 1, wherein:

the circuitry is further configured to determine that the broken portion is present in the rope in response to the determination score exceeding a first threshold value and, thereafter, the occurrence of the abnormal variation being detected and the car with no passenger passing the position.

7. The break detection device according to claim 3, wherein the circuitry is further configured to:

cause the car to make a round trip in a section including the stored position in response to the occurrence of the abnormal variation being detected, and determine that the broken portion is present in the rope in response to the determination score exceeding the first threshold value.

8. The break detection device according to claim 7, wherein:

the circuitry is further configured to cause the car to make the round trip in the section including the stored position until the determination score exceeds the first threshold value or the determination score becomes 0.

9. The break detection device according to claim 1, wherein:

the circuitry is further configured not to detect the occurrence of the abnormal variation in the output signal from the sensor during a time period immediately after the car starts to move.

10. The break detection device according to claim 9, wherein:

the time period immediately after the car starts to move is a time period from when the car starts to move to when an acceleration of the car becomes constant.

11. The break detection device according to claim 2, wherein:

the circuitry is further configured to detect the occurrence of the abnormal variation in response to the variation of the output signal from the sensor exceeding a second threshold value during a time period immediately after the car starts to move and during a time period immediately before the car stops, the second threshold value being a value greater than the first threshold value.

12. The break detection device according to claim 11, wherein:

each of the time period immediately after the car starts to move and the time period immediately before the car stops is a time period in which a speed of the car is lower than a first speed, and the first speed is a speed at which a frequency band of a torque ripple of a traction machine having a driving sheave around which the rope is wound deviates from a band of characteristic frequencies that are generated by contact of the broken portion present in the rope with a rope guide for the rope.

13. The break detection device according to claim 1, wherein:

the circuitry is further configured to extract a signal component in a band of characteristic frequencies that are generated by contact of the broken portion present in the rope with a rope guide for the rope.

14. The break detection device according to claim 1, wherein:

the output signal from the sensor is a torque signal from a traction machine having a driving sheave around which the rope is wound, a load signal from a load weighing device that detects a load of the car, a deviation signal between a speed command value to the traction machine and a speed signal from the traction machine, or an acceleration signal from an accelerometer that detects an acceleration of the car.

15. A break detection device comprising:

a sensor having an output signal, the output signal varying in response to vibration being generated in a rope of an elevator; and circuitry configured to:

detect an occurrence of an abnormal variation in the output signal from the sensor;

store, in response to the occurrence of the abnormal variation being detected, a position of a car of the elevator at a time of the occurrence of the abnormal variation in association with a determination score;

increase the determination score in response to the occurrence of the abnormal variation being detected and the car passing the stored position; and determine whether or not a broken portion is present in the rope on the basis of the determination score, wherein the circuitry is further configured to:

detect the occurrence of the abnormal variation in response to the variation of the output signal from the sensor exceeding a first threshold value, and detect the occurrence of the abnormal variation in response to the variation of the output signal from the sensor exceeding a second threshold value during a time period immediately after the car starts to move, the second threshold value being a value greater than the first threshold value.

16. The break detection device according to claim 15, wherein:

the circuitry is further configured to determine that the broken portion is present in the rope in response to the determination score exceeding a third threshold value.

17. The break detection device according to claim 16, wherein:

the circuitry is further configured to add a specific value to the determination score in response to the occurrence of the abnormal variation being detected and the car passing the stored position, and the third threshold value is a value greater than or equal to a sum of an initial value of the determination score and the specific value.

18. The break detection device according to claim 15, wherein:

the circuitry is further configured to determine that the broken portion is present in the rope in response to the determination score exceeding a third threshold value and, thereafter, the occurrence of the abnormal variation being detected and the car with no passenger passing the position.

19. The break detection device according to claim 16, wherein the circuitry is further configured to:

cause the car to make a round trip in a section including the stored position in response to the occurrence of the abnormal variation being detected, and determine that the broken portion is present in the rope in response to the determination score exceeding the third threshold value.

20. The break detection device according to claim 15, wherein:

the time period immediately after the car starts to move is a time period from when the car starts to move to when an acceleration of the car becomes constant.

21. The break detection device according to claim 15, wherein:

the circuitry is further configured to extract a signal component in a band of characteristic frequencies that are generated by contact of the broken portion present in the rope with a rope guide for the rope.

22. The break detection device according to claim 15, wherein:

the output signal from the sensor is a torque signal from a traction machine having a driving sheave around which the rope is wound, a load signal from a load weighing device that detects a load of the car, a deviation signal between a speed command value to the traction machine and a speed signal from the traction machine, or an acceleration signal from an accelerometer that detects an acceleration of the car.

23. A break detection device comprising:

a sensor having an output signal, the output signal varying in response to vibration being generated in a rope of an elevator; and circuitry configured to:

detect an occurrence of an abnormal variation in the output signal from the sensor;

store, in response to the occurrence of the abnormal variation being detected, a position of a car of the elevator at a time of the occurrence of the abnormal variation in association with a determination score;

increase the determination score in response to the occurrence of the abnormal variation being detected and the car passing the stored position:

decrease the determination score in response to the occurrence of the abnormal variation being not detected and the car passing the stored position again; and determine whether or not a broken portion is present in the rope on the basis of the determination score, wherein the circuitry is further configured to:

detect the occurrence of the abnormal variation in response to the variation of the output signal from the sensor exceeding a first threshold value, and detect the occurrence of the abnormal variation in response to the variation of the output signal from the sensor exceeding a second threshold value during a time period immediately after the car starts to move, the second threshold value being a value greater than the first threshold value.

24. The break detection device according to claim 23, wherein:

the circuitry is further configured to determine that the broken portion is present in the rope in response to the determination score exceeding a third threshold value.

25. The break detection device according to claim 24, wherein:

the circuitry is further configured to add a specific value to the determination score in response to the occurrence of the abnormal variation being detected and the car passing the stored position, and the third threshold value is a value greater than or equal to a sum of an initial value of the determination score and the specific value.

26. The break detection device according to claim 23, wherein:

the circuitry is further configured to subtract a specific value from the determination score in response to the occurrence of the abnormal variation being not detected and the car passing the stored position again, and the specific value is a value greater than 0 and less than or equal to ½ of an initial value of the determination score.

27. The break detection device according to claim 23, wherein:

the circuitry is further configured to determine that the broken portion is present in the rope in response to the determination score exceeding a third threshold value and, thereafter, the occurrence of the abnormal variation being detected and the car with no passenger passing the position.

28. The break detection device according to claim 24, wherein the circuitry is further configured to:

cause the car to make a round trip in a section including the stored position in response to the occurrence of the abnormal variation being detected, and determine that the broken portion is present in the rope in response to the determination score exceeding the third threshold value.

29. The break detection device according to claim 28, wherein:

the circuitry is further configured to cause the car to make the round trip in the section including the stored position until the determination score exceeds the third threshold value or the determination score becomes 0.

30. The break detection device according to claim 23, wherein:

the time period immediately after the car starts to move is a time period from when the car starts to move to when an acceleration of the car becomes constant.

31. The break detection device according to claim 23, wherein:

the circuitry is further configured to extract a signal component in a band of characteristic frequencies that are generated by contact of the broken portion present in the rope with a rope guide for the rope.

32. The break detection device according to claim 23, wherein:

the output signal from the sensor is a torque signal from a traction machine having a driving sheave around which the rope is wound, a load signal from a load weighing device that detects a load of the car, a deviation signal between a speed command value to the traction machine and a speed signal from the traction machine, or an acceleration signal from an accelerometer that detects an acceleration of the car.

33. A break detection device comprising:

a sensor having an output signal, the output signal varying in response to vibration being generated in a rope of an elevator; and circuitry configured to:

detect an occurrence of an abnormal variation in the output signal from the sensor;

store, in response to the occurrence of the abnormal variation being detected, a position of a car of the elevator at a time of the occurrence of the abnormal variation; and determine whether or not a broken portion is present in the rope on the basis of a frequency of the detection of the occurrence of the abnormal variation as the car passes the stored position.

34. The break detection device according to claim 33, wherein:

the circuitry is further configured to detect the occurrence of the abnormal variation in response to the variation of the output signal from the sensor exceeding a first threshold value.

35. The break detection device according to claim 33, wherein:

the circuitry is configured to calculate the frequency, and store, in response to the occurrence of the abnormal variation being detected, the position of the car of the elevator at the time of the occurrence of the abnormal variation in association with a detection value, and the detection value is set to a positive value in response to the occurrence of the abnormal variation being detected and the car passing the stored position, the detection value is set to 0 in response to the occurrence of the abnormal variation being not detected and the car passing the stored position, the circuitry is further configured to calculate a moving average of the detection value as the frequency, and determine whether or not the broken portion is present in the rope on the basis of the calculated moving average.

36. The break detection device according to claim 33, wherein:

the circuitry is further configured to determine that the broken portion is present in the rope in response to the frequency exceeding a first threshold value.

37. The break detection device according to claim 33, wherein:

the circuitry is further configured not to detect the occurrence of the abnormal variation in the output signal from the sensor during a time period immediately after the car starts to move.

38. The break detection device according to claim 34, wherein:

the circuitry is further configured to detect the occurrence of the abnormal variation in response to the variation of the output signal from the sensor exceeding a second threshold value during a time period immediately after the car starts to move, the second threshold value being a value greater than the first threshold value.

39. The break detection device according to claim 37, wherein:

the time period immediately after the car starts to move is a time period from when the car starts to move to when an acceleration of the car becomes constant.

40. The break detection device according to claim 38, wherein:

the time period immediately after the car starts to move is a time period from when the car starts to move to when an acceleration of the car becomes constant.

41. The break detection device according to claim 34, wherein:

the circuitry is further configured to detect the occurrence of the abnormal variation in response to the variation of the output signal from the sensor exceeding a second threshold value during a time period immediately after the car starts to move and during a time period immediately before the car stops, the second threshold value being a value greater than the first threshold value.

42. The break detection device according to claim 41, wherein:

each of the time period immediately after the car starts to move and the time period immediately before the car stops is a time period in which a speed of the car is lower than a first speed, and the first speed is a speed at which a frequency band of a torque ripple of a traction machine having a driving sheave around which the rope is wound deviates from a band of characteristic frequencies that are generated by contact of the broken portion present in the rope with a rope guide for the rope.

43. The break detection device according to claim 33, wherein:

the circuitry is further configured to extract a signal component in a band of characteristic frequencies that are generated by contact of the broken portion present in the rope with a rope guide for the rope.

44. The break detection device according to claim 33, wherein:

the output signal from the sensor is a torque signal from a traction machine having a driving sheave around which the rope is wound, a load signal from a load weighing device that detects a load of the car, a deviation signal between a speed command value to the traction machine and a speed signal from the traction machine, or an acceleration signal from an accelerometer that detects an acceleration of the car.

* * * * *